United States Patent
Fukuhara et al.

(10) Patent No.: US 7,925,102 B2
(45) Date of Patent: *Apr. 12, 2011

(54) PICTURE ENCODING APPARATUS AND METHOD, PROGRAM AND RECORDING MEDIUM

(75) Inventors: Takahiro Fukuhara, Kanagawa (JP); Seiji Kimura, Chiba (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 12/211,330

(22) Filed: Sep. 16, 2008

(65) Prior Publication Data

US 2009/0245668 A1 Oct. 1, 2009

Related U.S. Application Data

(63) Continuation of application No. 10/691,650, filed on Oct. 24, 2003, now Pat. No. 7,483,575.

(30) Foreign Application Priority Data

Oct. 25, 2002 (JP) ................................. 2002-311943

(51) Int. Cl.
*G06K 9/36* (2006.01)
(52) U.S. Cl. ...................................... 382/232
(58) Field of Classification Search .................. 382/100, 382/240, 234, 264, 232, 190; 348/231.1
See application file for complete search history.

(56) References Cited

U.S. PATENT DOCUMENTS

| 7,127,111 B2 | 10/2006 | Fukuhara et al. |
| 7,330,598 B2 | 2/2008 | Fukuhara et al. |
| 7,356,191 B2 | 4/2008 | Hosaka et al. |
| 2003/0122942 A1 | 7/2003 | Parker et al. |

FOREIGN PATENT DOCUMENTS

| JP | 8-186816 | 7/1996 |
| JP | 2001-358593 | 12/2001 |
| JP | 2002-165098 | 6/2002 |
| JP | 2002-204357 | 7/2002 |

OTHER PUBLICATIONS

ISO/IEC 15444-1, Information technology-JEPG 2000 Part 1: Core coding system, First edition Dec. 15, 2000.
The JEPG 2000 Still Image coding system: An overview, IEEE transaction on consumer electronics, vol. 46, No. 4, Nov. 2000.

*Primary Examiner* — Vu Le
*Assistant Examiner* — Claire Wang
(74) *Attorney, Agent, or Firm* — Oblon, Spivak, McClelland, Maier & Neustadt, L.L.P.

(57) ABSTRACT

An apparatus and a method for compressing a picture by wavelet transform and entropy coding, in which the processing load of arithmetic coding may be relieved and rate control may be carried out effectively, while still maintaining the picture quality. An encoding object prediction unit predicts bitplanes to be encoded and extracts only those bitplanes which are to be encoded. An EBCOT unit generates an encoding pass from one bitplane to be encoded to another to execute arithmetic coding. In controlling the code volume to a target code volume, a rate controller sums the arithmetic codes in a sequence from the arithmetic code with the highest bit position in the totality of the code blocks of an input picture to the arithmetic code of the lowermost bit, from one bitplane to another or from one encoding pass to another, and halts the summation when the predetermined target code volume is exceeded.

13 Claims, 22 Drawing Sheets

FIG.2

| number of effective bitplanes | number of bitplanes for encoding |
|---|---|
| 0-500 | 4 |
| 501-1000 | 5 |
| 1001- | 6 |

| Level | HL | LH | HH |
|---|---|---|---|
| 1 | 0-500      4<br>501-1000   5<br>1001-      6 | 0-500      4<br>501-1000   5<br>1001-      6 | 0-500      3<br>501-1000   4<br>1001-      5 |
| 2 | 0-500      4<br>501-1000   5<br>1001-      6 | 0-500      3<br>501-1000   4<br>1001-      5 | 0-500      3<br>501-1000   4<br>1001-      5 |
| 3 | 0-500      3<br>501-1000   4<br>1001-      5 | 0-500      3<br>501-1000   4<br>1001-      5 | 0-500      3<br>501-1000   4<br>1001-      5 |
| 4 | 0-500      1<br>501-1000   2<br>1001-      3 | 0-500      1<br>501-1000   2<br>1001-      3 | 0-500      1<br>501-1000   2<br>1001-      3 |
| 5 | 0-500      1<br>501-1000   2<br>1001-      3 | 0-500      1<br>501-1000   2<br>1001-      3 | 0-500      1<br>501-1000   2<br>1001-      3 |

FIG. 11

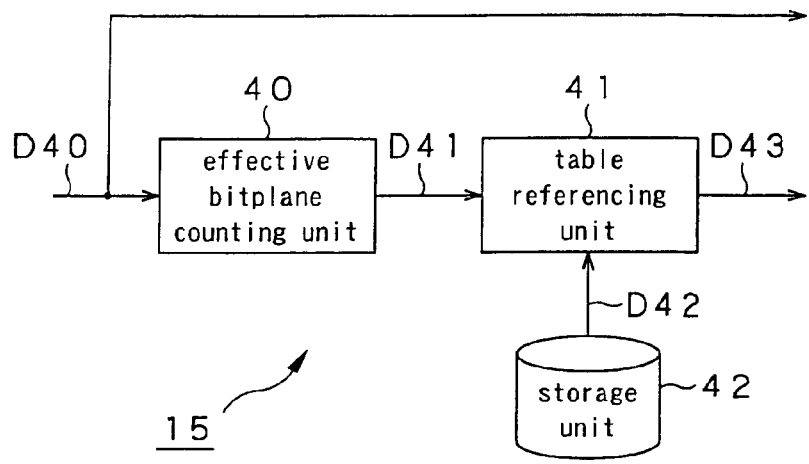
FIG.15
| number of effective bitplanes | number of encoding passes for encoding |
|---|---|
| 0-500 | 8 |
| 501-1000 | 10 |
| 1001- | 12 |
FIG.16
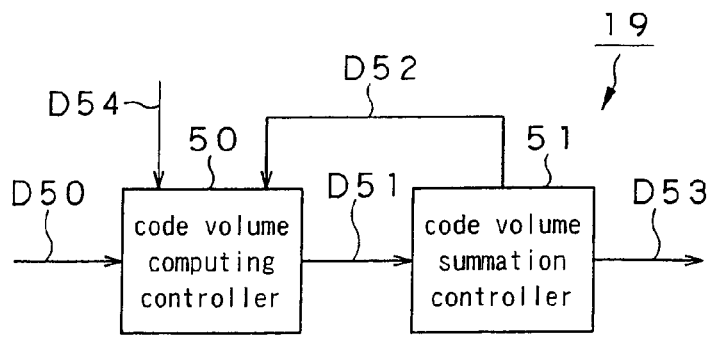
FIG.17

| Level | Y | | | | Cb | | | | Cr | | | |
|---|---|---|---|---|---|---|---|---|---|---|---|---|
| | LL | HL | LH | HH | LL | HL | LH | HH | LL | HL | LH | HH |
| 0 | 1.000 | | | | 1.000 | | | | 1.000 | | | |
| 1 | | 1.000 | 1.000 | 1.000 | | 0.813 | 0.813 | 0.738 | | 0.856 | 0.856 | 0.797 |
| 2 | | 1.000 | 1.000 | 1.000 | | 0.680 | 0.680 | 0.567 | | 0.750 | 0.750 | 0.656 |
| 3 | | 0.999 | 0.999 | 0.999 | | 0.489 | 0.489 | 0.349 | | 0.587 | 0.587 | 0.458 |
| 4 | | 0.838 | 0.838 | 0.702 | | 0.267 | 0.267 | 0.142 | | 0.375 | 0.375 | 0.236 |
| 5 | | 0.276 | 0.276 | 0.091 | | 0.090 | 0.090 | 0.090 | | 0.167 | 0.167 | 0.070 |

FIG.21

| Level | HL | LH | HH |
|---|---|---|---|
| 1 | 0-500    4<br>501-1000    5<br>1001-    6 | 0-500    4<br>501-1000    5<br>1001-    6 | 0-500    3<br>501-1000    4<br>1001-    5 |
| 2 | 0-500    4<br>501-1000    5<br>1001-    6 | 0-500    3<br>501-1000    4<br>1001-    5 | 0-500    3<br>501-1000    4<br>1001-    5 |
| 3 | 0-500    3<br>501-1000    4<br>1001-    5 | 0-500    3<br>501-1000    4<br>1001-    5 | 0-500    3<br>501-1000    4<br>1001-    5 |
| 4 | 0-500    1<br>501-1000    2<br>1001-    3 | 0-500    1<br>501-1000    2<br>1001-    3 | 0-500    1<br>501-1000    2<br>1001-    3 |
| 5 | 0-500    1<br>501-1000    2<br>1001-    3 | 0 | 0-500    1<br>501-1000    2<br>1001-    3 |

FIG.25

PICTURE ENCODING APPARATUS AND METHOD, PROGRAM AND RECORDING MEDIUM

CROSS-REFERENCE TO RELATED APPLICATIONS

This application is a Continuation of and claims the benefit priority from U.S. Ser. No. 10/691,650, filed Oct. 24, 2003, which claims the benefit of priority from Japanese Patent Application No. 2002-311943, filed Oct. 25, 2002, the entire contents of each of which are incorporated herein by reference.

BACKGROUND OF THE INVENTION

1. Field of the Invention

This invention relates to an apparatus and a method for encoding a picture by wavelet transform and entropy coding, for compression, as for example in JPEG-2000 system, a program for having a computer execute picture encoding processing, and a recording medium having the program recorded thereon.

2. Description of Related Art

Among known typical picture compression systems, there is a JPEG (Joint Photographic Experts Group) system, standardized by ISO (International Standards Organization). This system uses discrete cosine transform and is able to provide satisfactory encoded and decoded pictures when a larger amount of bits are allocated. However, if the number of bits for encoding is decreased to more than a certain extent, there occurs pronounced block distortion peculiar to DCT. The result is the pronounced subjective deterioration.

On the other hand, research in systems for splitting the frequency spectrum of a picture into plural frequency bands by a filter composed of a high-pass filter and a low-pass filter, known as a filter bank, and for performing encoding from one such frequency band to another, are progressing briskly. Of these systems, these systems, wavelet transform encoding is free from the drawback that block distortion becomes severe with higher compression, as in the case of the DCT, and hence is felt to be promising as a new technology which should take the place of the DCT.

The JPEG-2000 system, the international standardization for which has been completed in January 2001, uses a system which combines this wavelet transform with the high efficiency entropy encoding (bitplane based bit modeling and arithmetic coding) and has achieved marked improvement in the encoding efficiency as compared to JPEG.

These international standards provide only for decoder side regulations, such that the side encoder is able to attempt the designing freely. However, there lacks the standard relevant to an effective rate controlling method for achieving the target compression ratio, and hence the needs for setting up a proper knowhow are incumbent.

In particular, in the JPEG system, this rate control is difficult with the consequence that encoding needs to be performed a plural number of times until the target value is achieved. However, this leads to increased processing time. Thus, in the JPEG-2000 system, it is desired to achieve the target code volume by encoding only once.

In the JPEG-2000 system, the rate controlling method exploiting RD (rate distortion) characteristics is used by and large. However, this rate controlling method, while exhibiting all-purpose properties, suffers from an extremely high calculating load.

The present Assignee has already proposed in the undermentioned Cited Reference 1 a technique in which an encoded code stream, once generated, is truncated from the trailing end to perform rate control. With this technique, control correctly matched to the target code volume may be achieved.

Cited Reference 1
Japanese Laying-Open Patent Publication 2002-165098

However, if, with the technology of the Cited Reference 1, a code block which affects the picture quality appreciably is at the trailing end of the encoded code stream, the picture quality tends to be deteriorated by truncating the code block. Thus, a more effective rate control technique has been desired.

Moreover, there lacks in the JPEG-2000 system the standard relevant to the technique of relieving the usually high processing load of entropy encoding and hence the needs for setting up a proper know how are incumbent.

Additionally, the JPEG-2000 system is the standard for still pictures and no sufficient measures have taken for interlaced pictures which occur frequently in the moving pictures. Thus, if the technique used for still pictures is directly used for moving pictures, there occurs a noticeably deteriorated picture quality.

SUMMARY OF THE INVENTION

In view of the above-depicted status of the art, it is an object of the present invention to provide an apparatus and a method of e.g. the JPEG-2000 system in which the processing load for arithmetic coding may be relieved and deterioration in picture quality may be suppressed to enable effective rate control, a program for allowing a computer to execute the picture encoding processing, and a computer-readable recording medium having the program recorded thereon.

In the apparatus and method for encoding pictures, for accomplishing the above object, according to the present invention, sub-bands are generated and processed with hierarchical filtering. The sub-bands generated by this filtering processing are each divided into plural code blocks of a predetermined size and a number of bitplanes are generated from the most significant bit side to the least significant bit side, in terms of this code block as a unit. The number of bitplanes for encoding, as object of encoding, is predicted, and a number of the bitplanes corresponding to the predicted number of the bitplanes for encoding, as the object of the encoding, is extracted. Bit modeling is carried out from one such extracted bitplane to another and encoding passes are generated from one bitplane to another. Then, arithmetic coding is carried out in the generated encoding pass to generate arithmetic codes. Based on the generated arithmetic codes, the code volume is controlled so as to be equal to the target code volume. A header is appended to the arithmetic codes, the code volume of which has been controlled, to generate a packet.

In the apparatus and method for encoding pictures, for accomplishing the above object, according to the present invention, sub-bands are generated and processed with hierarchical filtering. The sub-bands generated by this filtering processing are each divided into plural code blocks of a predetermined size and a number of bitplanes are generated from the most significant bit side to the least significant bit side, in terms of this code block as a unit. The number of encoding passes for encoding, as object of encoding, is predicted to generate the information on the number of encoding passes. Bit modeling is carried out from one such bitplane to another and encoding passes are generated from one bitplane to another.

Then, arithmetic coding is applied to a number of encoding passes corresponding to the number of encoding passes specified in the information on the number of encoding passes, as counted from the most significant bit of each code block. The code volume is controlled, on the basis of the generated arithmetic codes, so that the target code volume will be reached. A header is a appended to the arithmetic codes, the code volume of which has been controlled, to generate a packet.

With such apparatus and method for picture encoding, the bitplanes or the encoding passes to be encoded are predicted in advance of the arithmetic coding, and only the bitplanes to be encoded are extracted to generate encoding passes to execute arithmetic coding. Or, the arithmetic coding is performed only on a number of the encoding passes generated from the totality of the bitplanes and which are specified by the information on the number of encoding passes.

In the apparatus and method for encoding pictures, for accomplishing the above object, according to the present invention, sub-bands are generated and processed with hierarchical filtering. The sub-bands generated by this filtering processing are divided into plural code blocks of a predetermined size and a number of bitplanes are generated from the most significant bit side to the least significant bit side, in terms of this code block as a unit. Bit modeling is performed from one bitplane to another and encoding passes are generated from one bitplane to another. In the so generated encoding passes, arithmetic coding is executed to produce arithmetic codes and, based on these generated arithmetic codes, the code volume is controlled so that the targeted code volume will be reached. The arithmetic codes are summed, from one bitplane to another or from one encoding pass to another, in the sequence from the arithmetic code with the highest bit position in the totality of the code blocks in the input picture to the lowermost bit, until the predetermined target code volume is exceeded, at which time the summation is terminated. A header is then appended to the arithmetic code, having the code volume controlled, to generate a packet.

In the above-described apparatus and method for encoding the picture, in controlling the code volume to the target code volume, based on the arithmetic codes generated on arithmetic coding, the arithmetic codes are summed from one bitplane to another or from one code pass to another, in the sequence from the arithmetic code with the highest bit position to the arithmetic code of the lowermost bit, and the summation is halted when the target code volume is exceeded.

In the apparatus and method for encoding pictures, for accomplishing the above object, according to the present invention, sub-bands are generated and processed with hierarchical filtering. The transform coefficients in the sub-bands, generated by this filtering, are divided by a quantization step size weighted using weighting coefficients, set from one sub-band to another, by way of performing quantization. Each sub-band, resulting from the quantization, is split to generate code blocks each being of a predetermined size. A plural number of bitplanes, beginning from the uppermost bit and ending in the lowermost bit, are generated from one code block to another. Bit modeling is performed from one bit plane to another and an encoding pass is generated from one bit plane to another. In the so generated encoding pass, arithmetic coding is carried out and, based on the so generated arithmetic codes, the code volume is controlled so as to be equal to the target code volume. The arithmetic codes are summed together, in a sequence from the arithmetic code with the highest bit position to the arithmetic code with the lowermost bit position, in the totality of the code blocks in the input picture, on the bitplane basis or on the encoding pass basis. This summation is discontinued when the predetermined target code volume is exceeded. A header is appended to the arithmetic codes, controlled as to code volume, to generate a packet.

With this image encoding apparatus and method, the quantization step size is weighted, using weighting coefficients set from sub-band to sub-band at the time of quantization. Moreover, in controlling the code volume, based on the arithmetic codes generated by the arithmetic coding, the code volume is controlled so as to be equal to the target code volume, the arithmetic codes are summed, from one bitplane to another or from one encoding pass to another, in a sequence from the arithmetic code with the highest bit position to the arithmetic code with the lowermost bit position. The summation is discontinued when the predetermined target code volume is exceeded.

The program according to the present invention allows a computer to execute the aforementioned picture encoding processing. The recording medium according to the present invention is a computer-readable recording medium having the program recorded thereon.

In the apparatus and method for encoding pictures, for accomplishing the above object, according to the present invention, the bitplane or the encoding pass being encoded is predicted at the outset, prior to executing the arithmetic coding, and only the bitplane being encoded is extracted to generate an encoding pass to execute the arithmetic coding. Or, the arithmetic coding is executed only for a number of the encoding passes of the encoding passes, which is generated from the totality of the bitplanes and which is accorded by the information on the number of the encoding passes, in order to relieve the load of processing involved in the arithmetic coding.

In controlling the code volume to give the target code volume based on the arithmetic codes generated by the arithmetic coding, the arithmetic codes are summed in a sequence beginning from the arithmetic code with the highest bit position and ending in the arithmetic code with the lowermost bit, in the totality of the code blocks of the input picture, from one bitplane to another or from one code block to another, and the summation is discontinued when the predetermined target code volume is exceeded. This suppresses the picture quality difference from one sub-band to another to a minimum to realize a high quality picture on the whole.

Moreover, in weighting the quantization step size, using the weighting coefficients set from sub-band to sub-band at the time of the quantization, so that the quantization step size will become smaller the lower the frequency of the sub-band of the low range component, and in controlling the code volume, based on the arithmetic codes generated by the arithmetic coding, so that the code volume will be equal to the target code volume, the arithmetic codes are summed in a sequence from the arithmetic code with the highest bit position to the arithmetic code of the lowermost bit, from one bitplane to another or from one code block to another, and the summation is halted when the predetermined target code volume is exceeded. This enables the information to be packetized preferentially beginning from the information of higher criticality, and hence to provide an encoded picture of higher picture quality.

Additionally, with the program and the recording medium according to the present invention, the aforementioned picture encoding processing can be realized by the software.

In accordance with the present invention, described above, it is possible with e.g. an image encoding apparatus of the JPEG-2000 system to relieve the processing load in arithmetic encoding and to suppress degradation in the picture quality to execute rate control effectively.

BRIEF DESCRIPTION OF THE DRAWINGS

FIG. 2 illustrates sub-bands of wavelet transform and splitting up to a splitting level=3.

FIG. 11 shows an instance of a bitplane number table in case of utilizing the sum total of the sub-band-based numbers of effective bitplanes.

FIG. 15 illustrates an instance of an inner structure of an encoding object prediction unit in case of predicting the number of encoding passes of the encoding object.

FIG. 16 shows an instance of a table of the number of encoding passes in case of utilizing the sum total of the sub-band based effective bitplanes.

FIG. 17 shows an illustrative inner structure of a rate controller in the picture encoding apparatus.

FIG. 21 shows an instance of a weighting coefficient table in case of quantization with weighting from one sub-band to another.

FIG. 25 shows an instance of a bitplane number table in case an input image is an interlaced image and in which the sum total of the numbers of sub-band based effective bitplanes is utilized.

DESCRIPTION OF THE PREFERRED EMBODIMENTS

Figure 1:
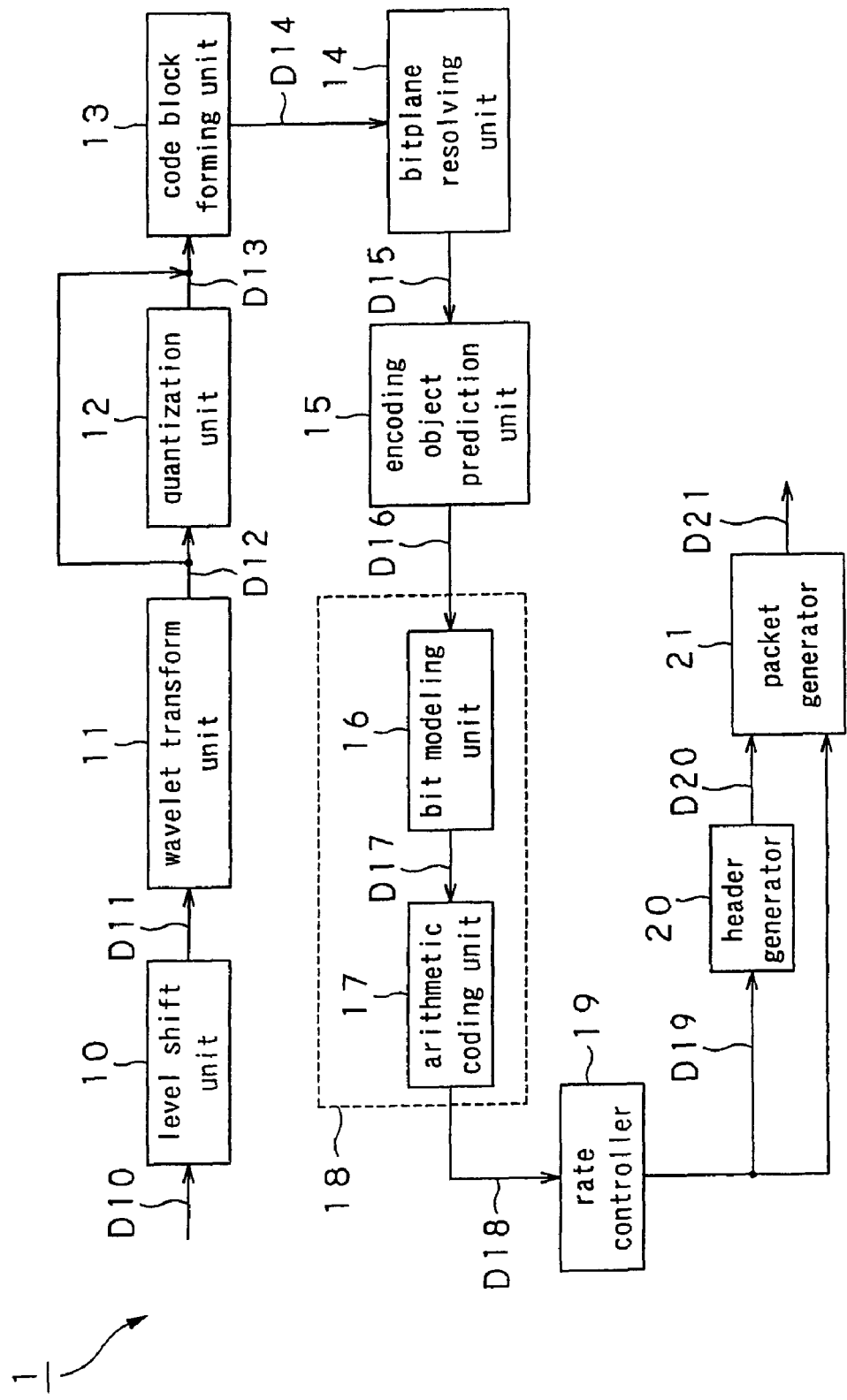
FIG. 1 illustrates a schematic structure of a picture encoding apparatus embodying the present invention.

Referring to the drawings, specified embodiments of the present invention will be explained in detail. In the present embodiment, the present invention is applied to a method and an apparatus for encoding a picture in which an input image is encoded for compression in accordance with the JPEG-2000 system. In the following, the overall structure and the operation of the picture encoding apparatus are first explained, and essential portions of the present picture encoding apparatus relevant to the present invention are then explained.

(1) Structure and Operation of the Picture Encoding Apparatus

The schematic structure of the picture encoding apparatus of the present embodiment is shown in FIG. 1. Referring to FIG. 1, the picture encoding apparatus 1 is made up by a DC level shift unit 10, a wavelet transform unit 11, a quantization unit 12, an encoding block forming unit 13, a bitplane resolving unit 14, an encoding object prediction unit 15, a bit modeling unit 16, an arithmetic coding unit 17, a rate controller 19, a header generator 20 and a packet generator 21.

The bit modeling unit 16 and the arithmetic coding unit 17 make up an EBCOT (Embedded Coding with Optimized Truncation) unit 18.

The DC level shift unit 10 performs level shift of the original signals for executing wavelet transform in the downstream side wavelet transform unit 11 for improving the compression factor. As a principle, the RGB signals are of a positive value (an integer without a sign). Thus, the level shift of halving the dynamic range of the original signals leads to improved compression efficiency. On the contrary, chroma signals, such as Cb or Cr in the YCbCr signal, are of integer values with both positive and negative signs, and hence no level shift is executed.

The wavelet transform unit 11 is usually formed by a filter bank made up by a low-pass filter and a high-pass filter. The digital filter usually has an impulse response of plural tap lengths (filter coefficients) and hence input pictures which permit filtering need to be buffered at the outset. However, this is not illustrated in FIG. 1 for simplicity.

The DC level shift unit 10 is supplied with a necessary minimum volume of picture signals D10 to execute filtering and executes the level shift as described above. The wavelet transform unit 11 performs filtering for applying wavelet transform to the DC level shifted picture signals D11 to generate wavelet transform coefficients D12.

Figure 2:
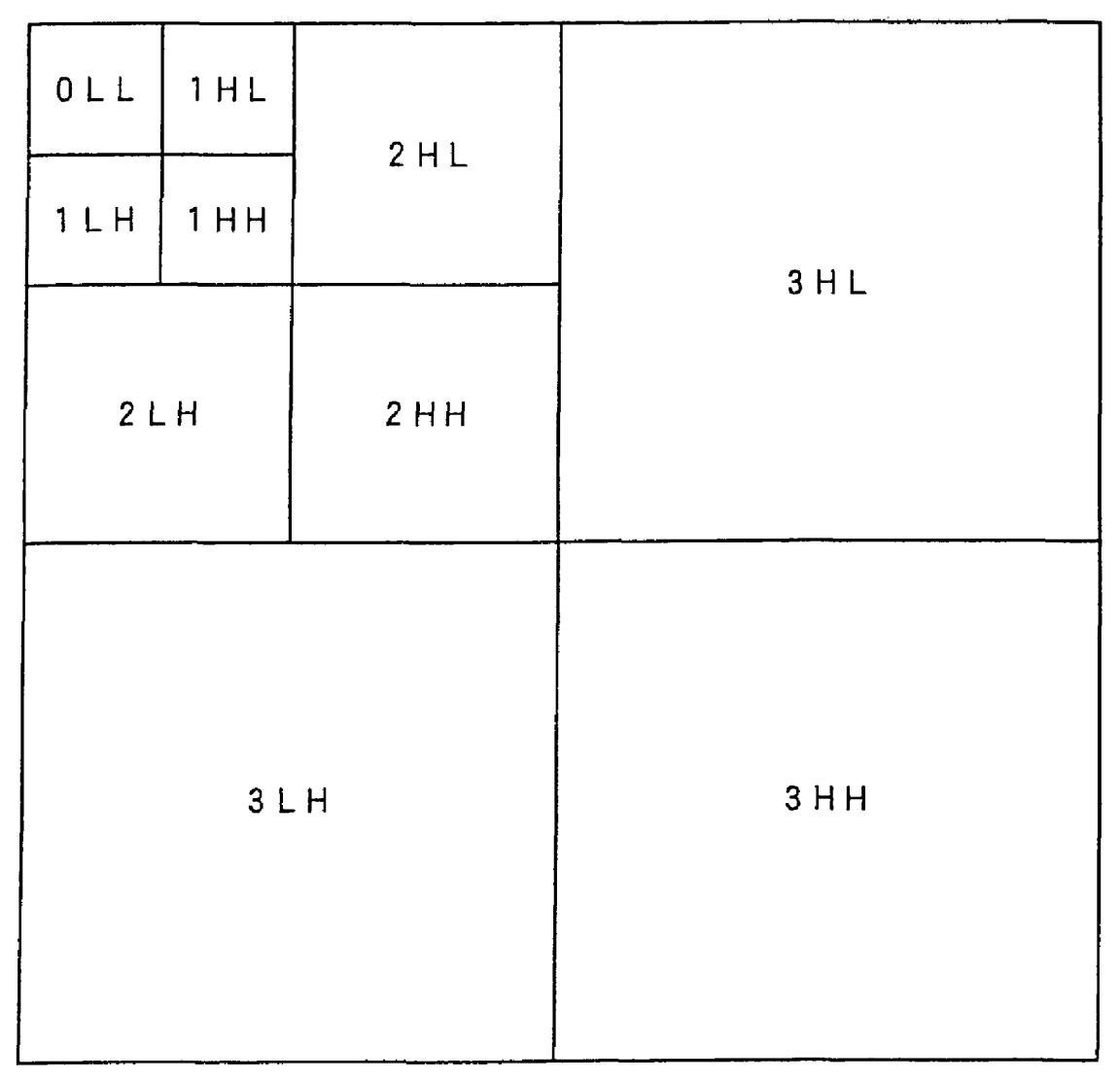
Figure 3B:
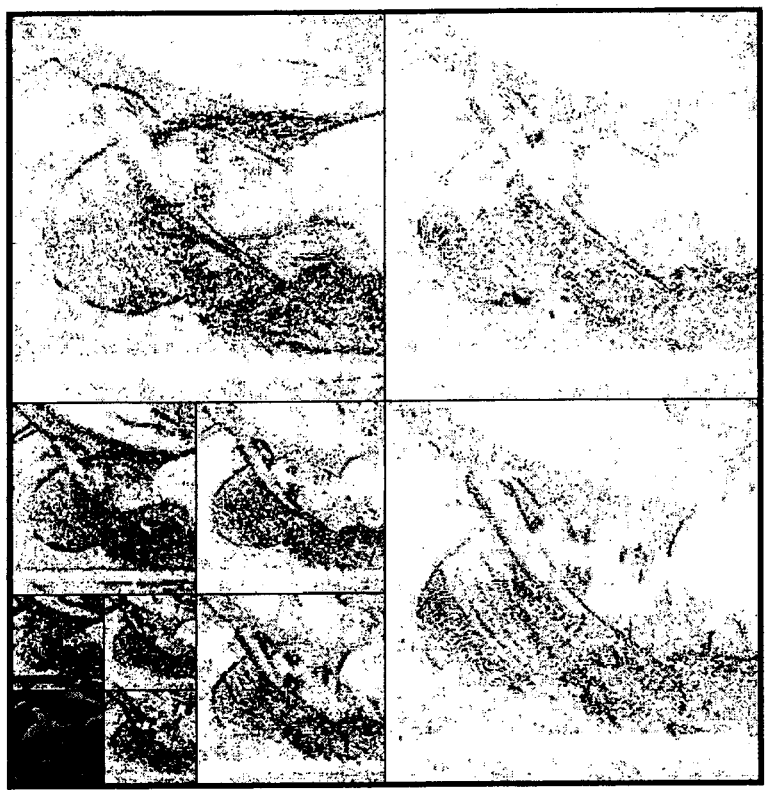
FIGS. 3A and 3B illustrate sub-bands of wavelet transform and splitting of an actual image.
Figure 3A:
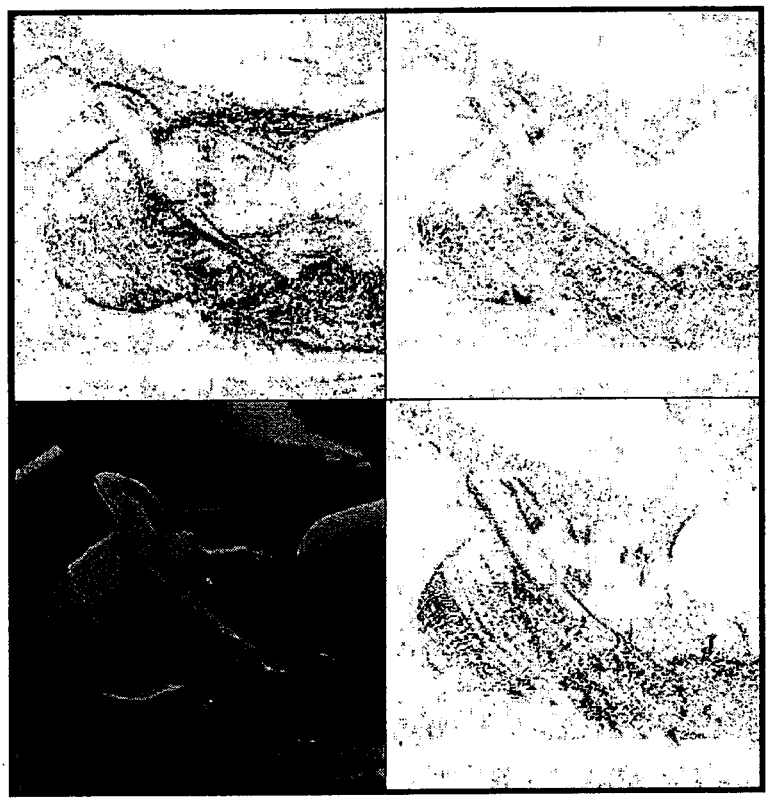

In this wavelet transform, low frequency signals usually are transformed a number of times, as shown in FIG. 2, because the predominant portion of the energy of the picture is concentrated in the low frequency components. This may also be seen from the fact that, as the level of splitting proceeds from the splitting level=1 shown in FIG. 3A to the splitting level=3 shown in FIG. 3B, the sub-bands are formed, as indicated in these figures. It is noted that the number of levels of the wavelet transform in FIG. 2 is 3, as a result of which ten sub-bands are generated. In FIG. 2, L and H denote the low and high bands, respectively, with the numbers preceding L and H indicating the splitting levels. For example, 1LH denotes a sub-band with the splitting level=1 of low frequency in the horizontal direction and of high frequency in the vertical direction.

The quantization unit 12 applies irreversible compression to the wavelet transform coefficients D12 supplied from the wavelet transform unit 11. As quantization means, scalar quantization of dividing the wavelet transform coefficients D12 with a quantization step size may be used. The standard of the JPEG-2000 system provides that, in case of carrying out the above-mentioned irreversible compression, with the use of an irreversible 9×7 wavelet transform filter, scalar quantization be used simultaneously automatically. On the other hand, if the reversible 5×3 wavelet transform filter is used, quantization is not performed, and code volume control is performed in the rate controller 19 as later explained. Thus, in effect, it is when the irreversible 9×7 wavelet transform filter is used that the quantization unit 12 of FIG. 1 is in operation. It is assumed in the following explanation that this irreversible 9×7 wavelet transform filter is used.

Figure 4:
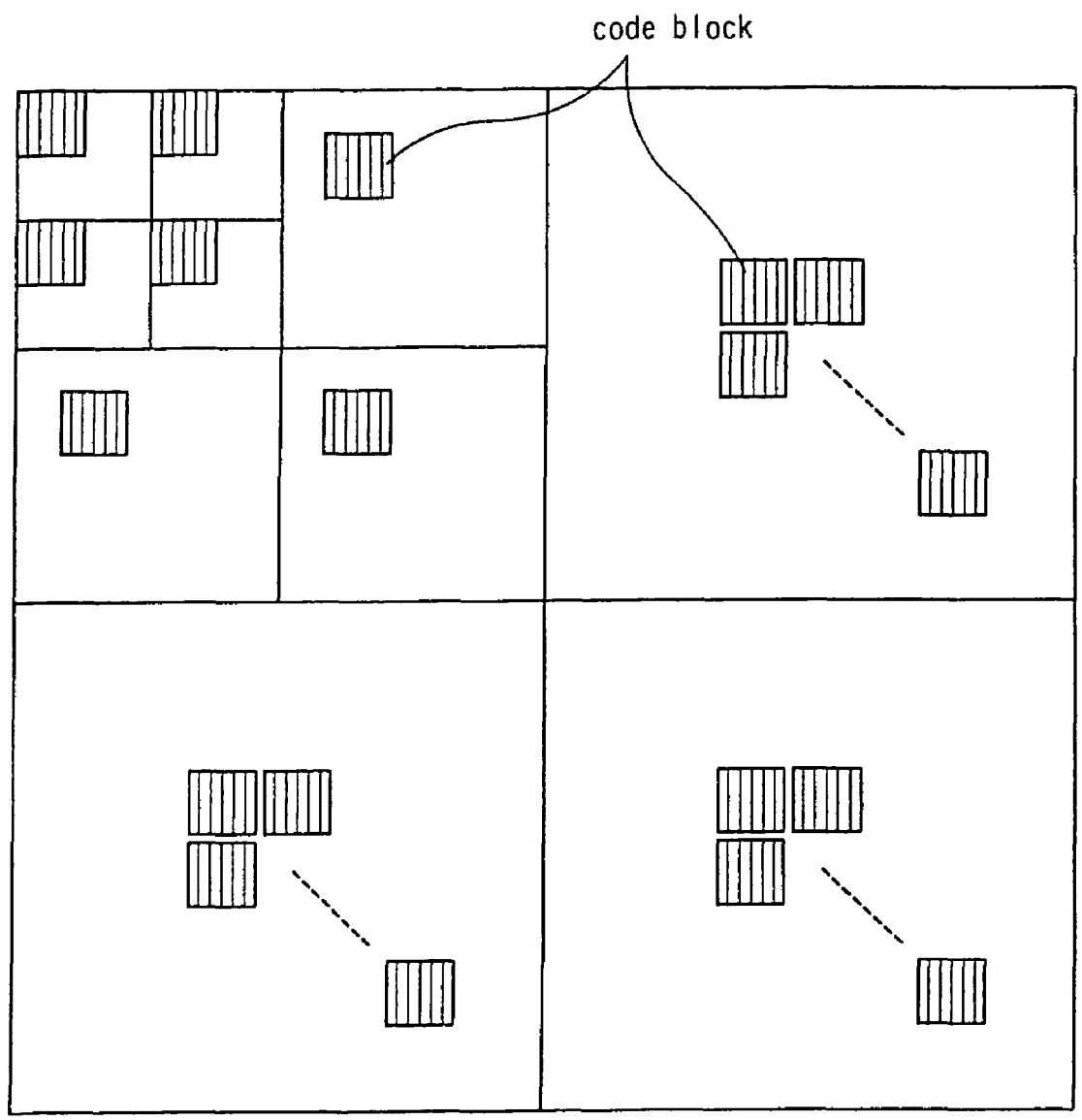
FIG. 4 illustrates the relationship between encoding blocks and the sub-bands.

The encoding block forming unit 13 splits quantization coefficients D13, generated by the quantization unit 12, into plural code blocks, each being of a preset size, and each representing a processing unit for entropy coding. FIG. 4 shows position relationships of the encoding blocks in the sub-bands. Usually, code blocks, each being of a size on the order of 64×64, are generated in all of the sub-bands generated on splitting. Thus, if the size of the sub-band 3HH, having the lowermost splitting level in FIG. 2, is 640×320, there are 10 (in the horizontal direction) by 5 (in the vertical direction), totaling at 50, code blocks of the size of 64×64. The encoding block forming unit 13 sends code block based quantization coefficients D14 to the bitplane resolving unit 14, such that downstream side encoding processing is carried out from one such code block to another.

Figure 5:
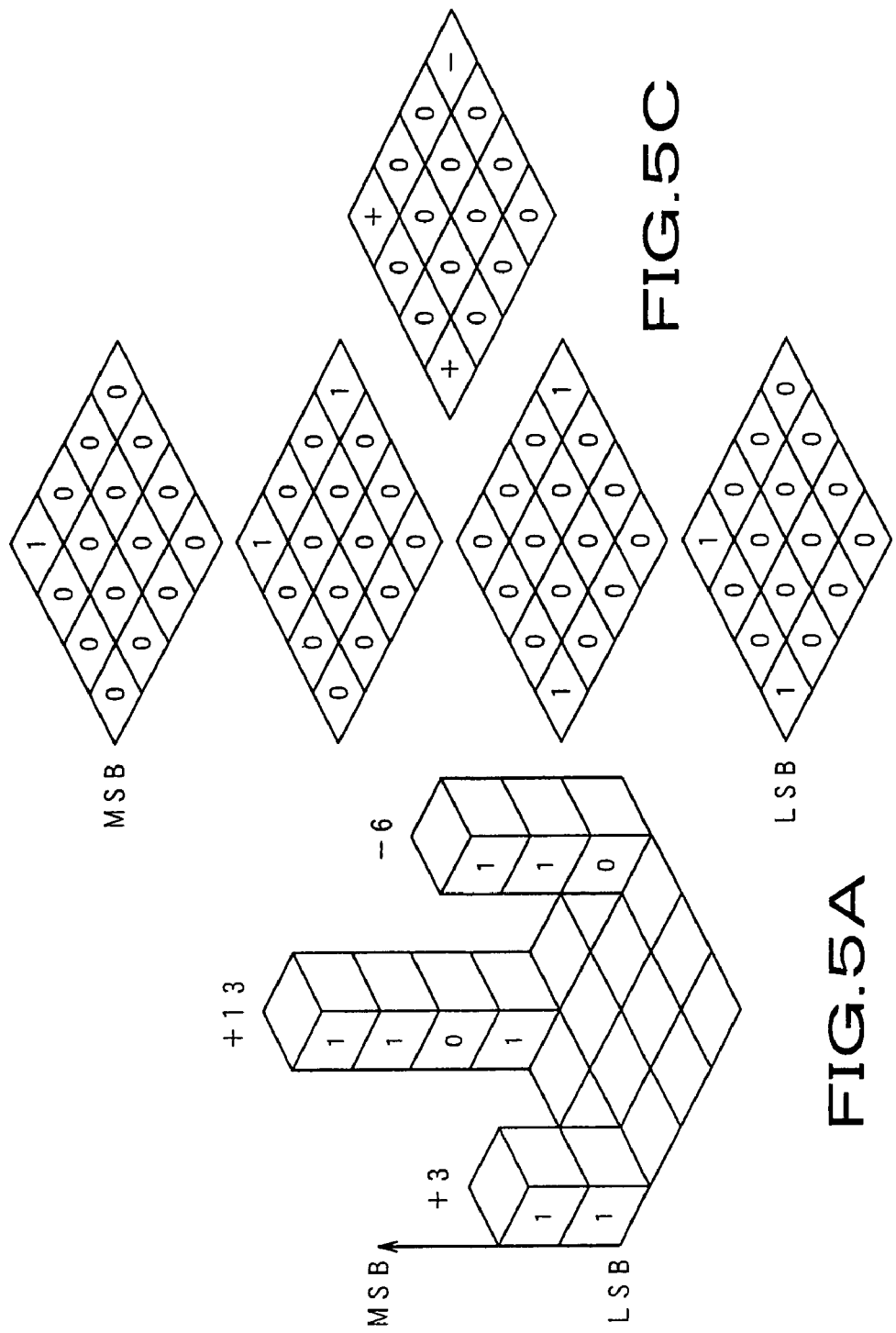
FIG. 5 illustrates bitplanes, FIG. 5A showing 16 quantization coefficients, FIG. 5B showing bitplanes of absolute values of the coefficients and FIG. 5C showing a bitplane for the sign.

The bitplane resolving unit 14 resolves the code block based quantization coefficients D14 into bitplanes. The concept of the bitplane is now explained by referring to FIG. 5. In FIG. 5A, 4 longitudinal by 4 transverse coefficients, totaling at 16 coefficients, are presupposed. Of these 16 coefficients, the coefficient having the maximum absolute value is 13, which is 1101 in binary representation. Consequently, the absolute values of the coefficients are constituted by four bitplanes shown in FIG. 5B. Meanwhile, the respective elements of the bitplanes assume the values of 0 or 1. On the other hand, the sign of the quantization coefficient is minus only for −6, with the other quantization coefficients being 0 or of positive values. Thus, the bitplane for the sign is as shown in FIG. 5C. The bitplane resolving unit 14 sends the quantization coefficients D15, thus resolved into the bitplanes, to the encoding object prediction unit 15.

The encoding object prediction unit 15 pre-estimates, based on the quantization coefficients D15, resolved into the bitplanes by the bitplane resolving unit 14, the number of the bitplanes or the number of encoding passes, to be ultimately encoded, prior to encoding in the EBCOT unit 18, extracts the so pre-estimated bitplanes, and routes the coefficient bits D16, from one extracted bitplane to another, to the bit modeling unit 16. The predicting processing in this encoding object prediction unit 15 will be explained in detail subsequently.

The bit modeling unit 16 performs coefficient bit modeling on the bitplane based coefficient bits D16, supplied from the encoding object prediction unit 15, as now explained, to route a coefficient bit based context D17 to the arithmetic coding unit 17. The arithmetic coding unit 17 performs arithmetic coding on the coefficient bit based context D17 to route resulting arithmetic codes D18 to the rate controller 19. The present embodiment is now explained taking entropy encoding, termed EBCOT, specifically provided for in the JPEG-2000 standard, as an example. This EBCOT is explained in detail in for example a publication entitled [ISO/IEC 15444-1, Information technology-JPEG 2000, part 1: Core Coding System]. As aforesaid, the EBCOT unit 18 is made up by the bit modeling unit 16 and the arithmetic coding unit 17.

The EBCOT is means for performing the encoding as a statistic quantity of coefficient bits, in a block of a predetermined size, is measured from one such block to another, and entropy encodes the quantization coefficients in terms of a code block as a unit. The code block is encoded in a direction from the most significant bit (MSB) towards the least significant bit (LSB) independently from one bitplane to another. The size of the code block in the longitudinal and transverse directions is powers of 2 of from 4 to 256. The size of 32×32, 64×64 or 128×32 is commonly used. The quantization coefficients are represented by n-bit signed binary number, with respective bits from the LSB to the MSB being indicated by bit 0 to bit (n−2). The remaining one bit is a sign bit. The code blocks are sequentially encoded by the following three encoding passes (a) to (c), beginning from the MSB side bitplane:
(a) a significance propagation pass;
(b) a magnitude refinement pass; and
(c) a cleanup pass.

Figure 6:
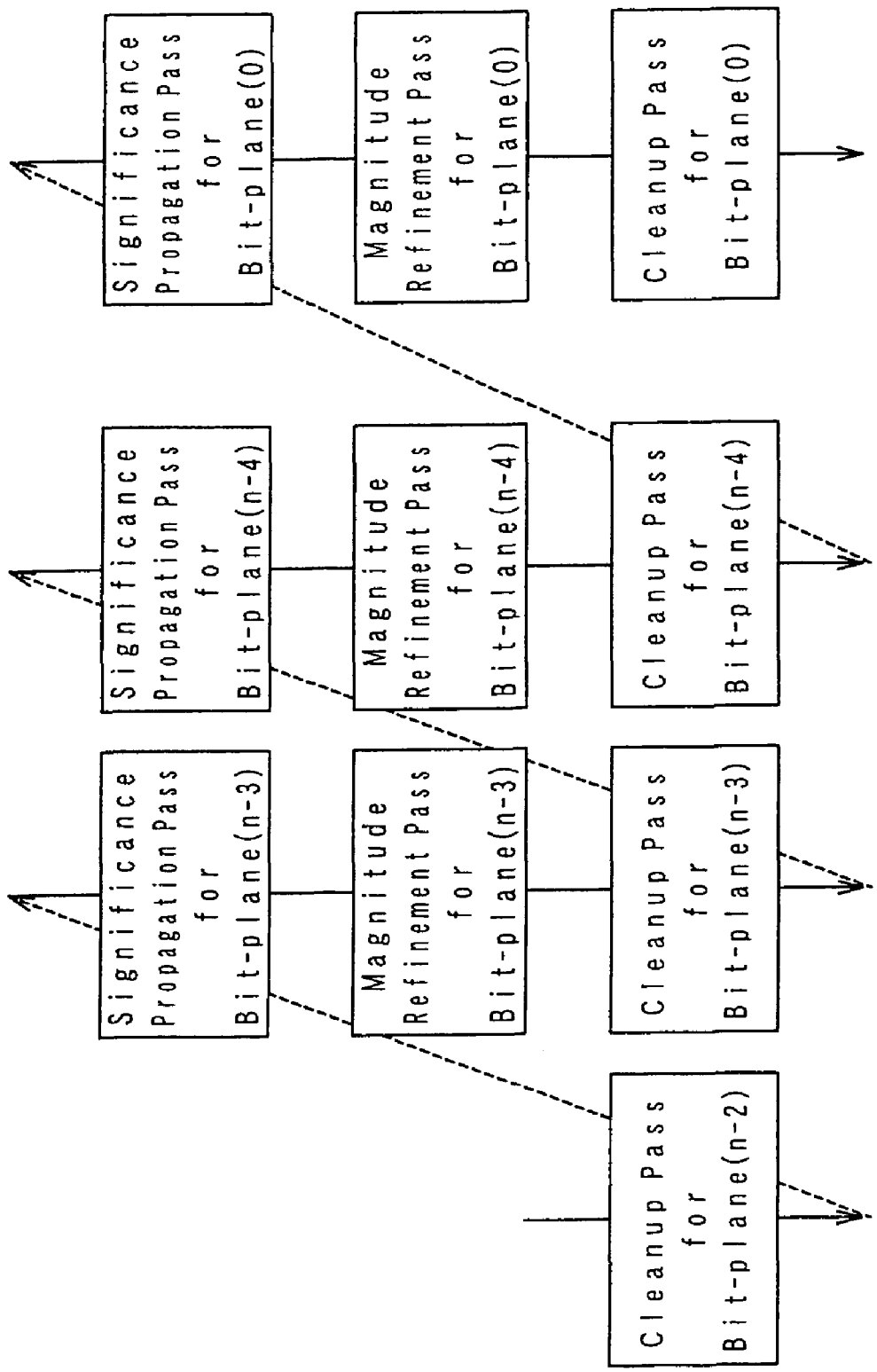
FIG. 6 illustrates the processing sequence of encoding passes in an encoding block.

FIG. 6 shows the sequence in which the three encoding passes are used. Referring to FIG. 6, the bitplane (n−2) (MSB) is encoded, first of all, by a cleanup pass (sometimes referred to below as CU pass). The processing proceeds sequentially towards the LSB side, so that the respective bitplanes are encoded, using the significance propagation pass (sometimes referred to below as SP pass), the magnitude refinement pass (sometimes referred to below as MR pass) and the cleanup pass, in this order.

In actuality, in which number bitplane, as counted from the MSB side, "1" appears for the first time, is written in a header, such that the bitplanes made up by zero coefficients only (zero bitplane) are not encoded. The bitplanes are encoded, repeatedly using the three sorts of the encoding passes. The encoding is discontinued at an optional encoding pass of an optional bitplane, in order to take trade-off between the code volume and the picture quality, by way of performing rate control.

Figure 7:
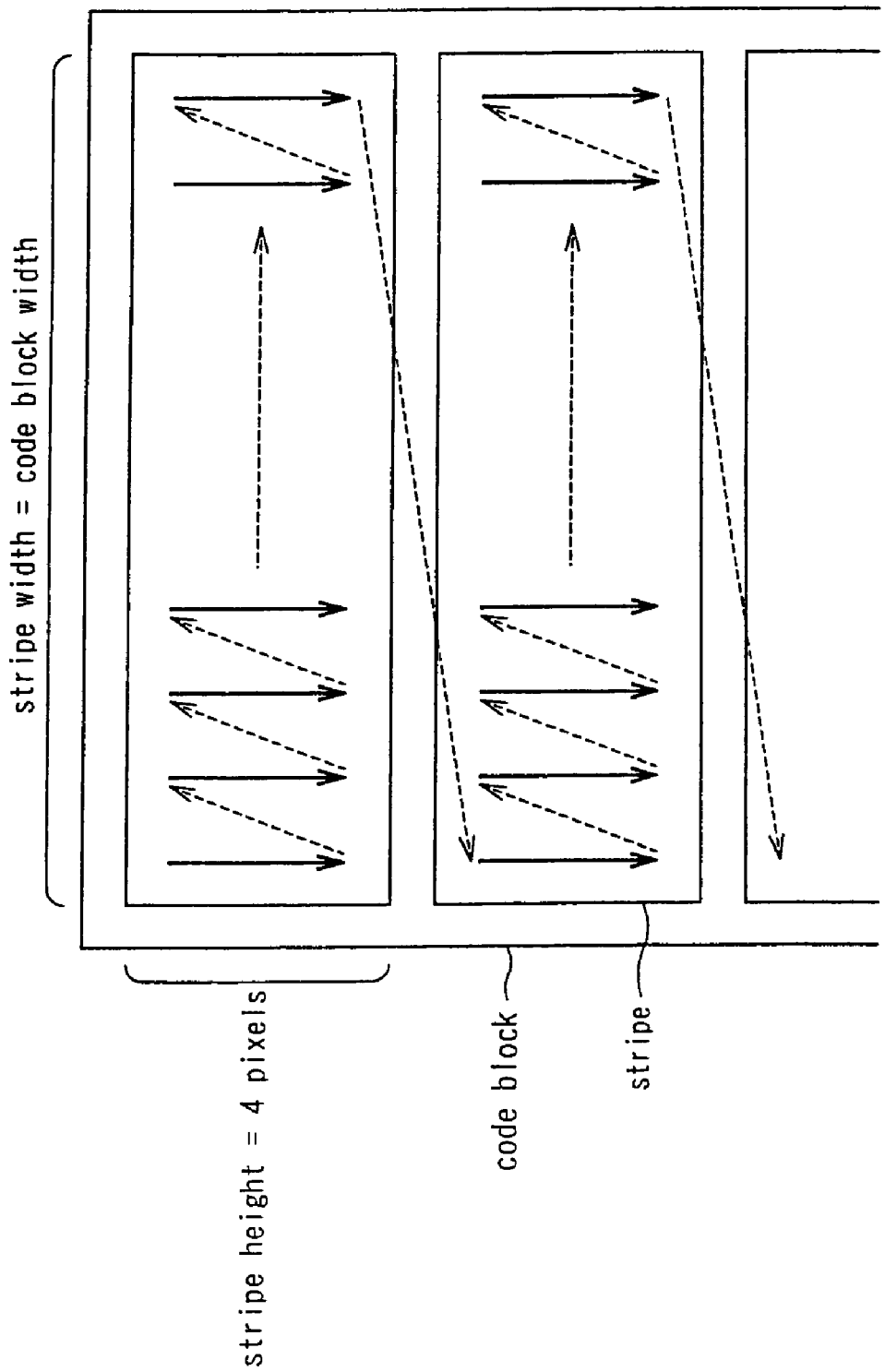
FIG. 7 illustrates the scanning sequence of coefficients in an encoding block.

Referring to FIG. 7, the scanning of coefficients bits is explained. Each code block is divided into stripes every four coefficient bits in the height-wise direction. The stripe width is equal to the width of the code block. The scanning sequence means a sequence in which the totality of coefficient bits in a given code block are scanned. Specifically, the coefficient bits are scanned from an upper stripe towards a lower stripe in a given code block, from a left column towards a right column in a given stripe and from above to below in each vertical string. Meanwhile, in each encoding pass, the totality of the coefficient bits in a code block are processed in this scanning order.

The aforementioned three encoding passes are hereinafter explained. Meanwhile, these three encoding passes are explained in the aforementioned reference material [ISO/IEC 15444-1, Information technology-JPEG 2000, Part 1: Core Coding System].

(a) Significant Propagation Pass

In an SP pass for encoding a given bitplane, non-significant coefficient bits in which at least one coefficient in the vicinity of 8 is significant are encoded by arithmetic coding. If the value of the encoded coefficient bit is 1, the sign (plus or minus sign) of the code is then encoded by arithmetic coding.

The 'significance' means the state an encoder has for each coefficient bit. The initial value of the significance is [0] indicating being non-significant, and is changed to [1], indicating being significant, when [1] is encoded with the coefficient. The value then continues to be [1] at all times. Consequently, the 'significance' may be said to be a flag indicating whether or not the information of an effective digit has already been encoded. If the SP pass has occurred in a given bitplane, no SP pass occurs in the subsequent bitplanes.

(b) Magnitude Refinement Pass

In the MR pass, encoding a bitplane, the 'significant' coefficient bit, not encoded in the SP pass, encoding a bitplane, is arithmetically encoded.

(c) Clean Up Pass

In the Cu pass, encoding a bitplane, a 'non-significant' coefficient bit, not encoded in the SP pass, encoding the bitplane, is arithmetically encoded. If the value of the encoded coefficient bit is 1, the sign (plus or minus sign) is then arithmetically encoded.

In the arithmetic coding of the above-described three encoding passes, the context of the coefficients is selected as ZC (zero coding), RLC (run-length coding), SC (sign coding) and MR (magnitude refinement) are selectively used case-by-case. The context selected is encoded by arithmetic coding termed the MQ encoding. This MQ encoding is a learning type bi-level arithmetic coding provided for in JPEG2. The MQ encoding is described in for example a reference material [ISO/IEC FDIS 14492, "Lossy/Lossless Coding of Bi-level Images", March 2000]. The JPEG-2000 provides for a sum total of 19 sorts of contexts in the totality of the encoding passes.

The bit modeling unit 16 processes the bitplane based coefficient bits D16 in three encoding passes to generate the coefficient bit based context D17. The arithmetic coding unit 17 applies arithmetic coding to this coefficient bit based context D17.

After completing the processing for at least a portion of the encoding passes, the rate controller 19 counts the code volume of the arithmetic code D18, supplied from the arithmetic coding unit 17 and, when the target code volume is reached, the rate controller truncates the succeeding portion of the arithmetic code D18. By truncation at a point directly previous to the surpassing of the code volume, it is possible to suppress the code volume positively to a target code volume. The rate controller 19 sends an arithmetic code D19 following the completion of the code volume control to the header generator 20 and to the packet generator 21. The rate controlling processing in the rate controller 19 will be explained subsequently in detail.

The header generator 20 generates, based on the arithmetic code D19, following the completion of the code volume control, supplied by the rate controller 19, the supplementary information in the code block, for example, the number of code passes in the code block or the data length of the compressed code stream, as a header D20, and routes the header D20 to the packet generator 21.

Figure 8:
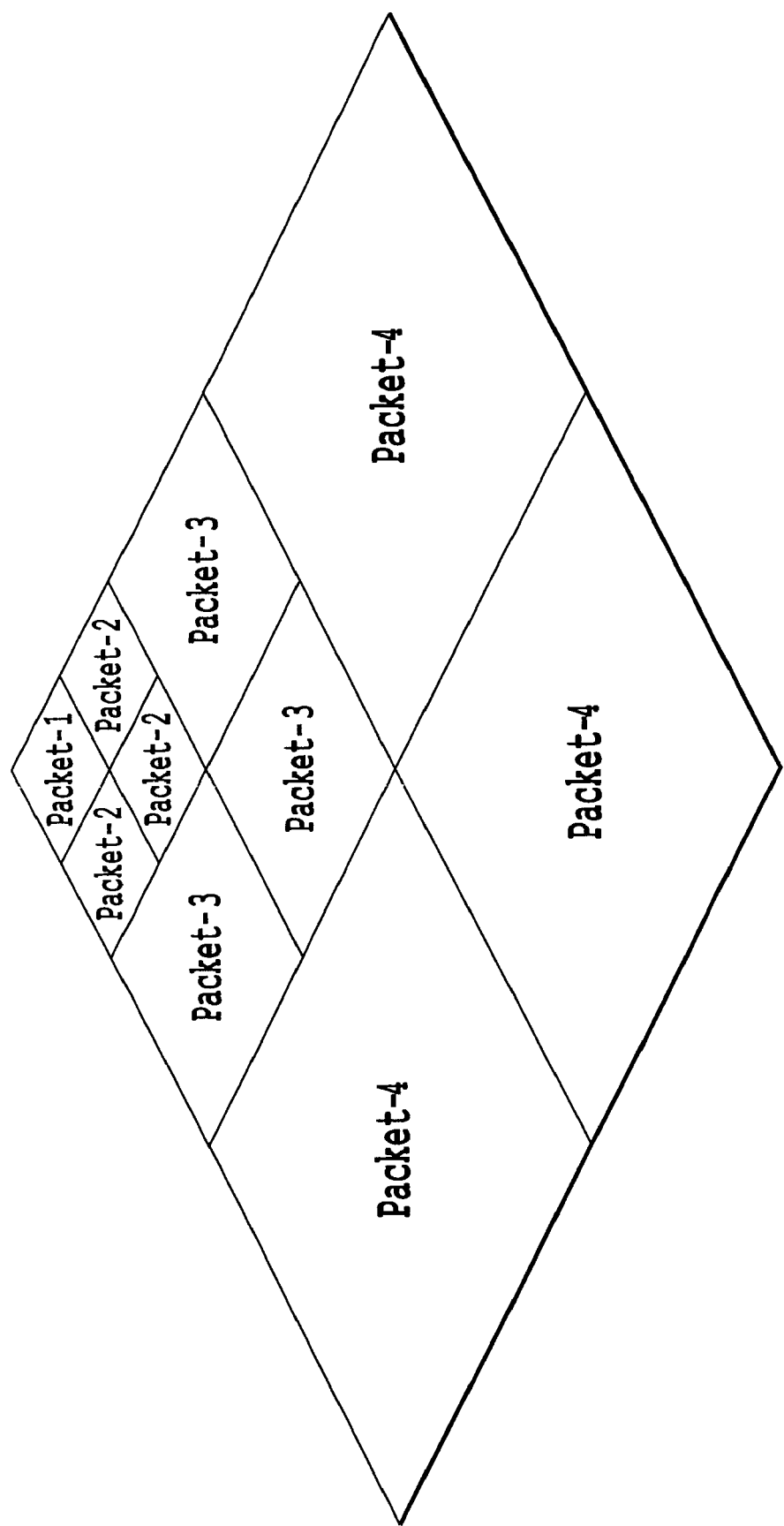
FIG. 8 illustrates a packet generated by the picture encoding apparatus.

The packet generator 21 combines the arithmetic codes D19 and D20, following the completion of the code volume control, to form a packet D21, which is then output as an encoded code stream. The packet generator 21 generates individual packets from the same resolution level, as shown in FIG. 8. Meanwhile, as may be seen from FIG. 8, the packet 1-1, as the lowermost frequency range, contains only an LL component, while the remaining packets 1-2 to 1-4 contain LH, HL and HH components.

With the picture encoding apparatus 1 of the present embodiment, described above, it is possible to encode an input picture for compression to a high efficiency, using wavelet transform and entropy coding, to packetize the encoded input picture, and to output the resulting packet as an encoded code stream.

(2) Relevant Portions in a Picture Encoding Apparatus (2-1) Structure and Operation of the Prediction Unit for an Encoding Object In general, there is imposed on a picture encoding apparatus, adapted for encoding an input picture for compression in accordance with the JPEG-2000 system, an extremely large load in connection with processing for entropy encoding in EBCOT. On the other hand, in encoding to the target compression ratio or bitrate, there are those quantization coefficients which, after encoding by the EBCOT, are not actually used, these non-used quantization coefficients ultimately becoming wasteful coefficients.

Thus, with the encoding object prediction unit 15 in the present embodiment, the bitplanes highly likely to be used ultimately are pre-estimated, and only these bitplanes are extracted and supplied to the EBCOT unit 18. Specifically, the number of effective bitplanes for one frame or one sub-band is counted and used as an index for the code volume which generates the number of the effective bitplanes in order to predict the number of the ultimately encoded bitplanes.

Figures 9, 10:
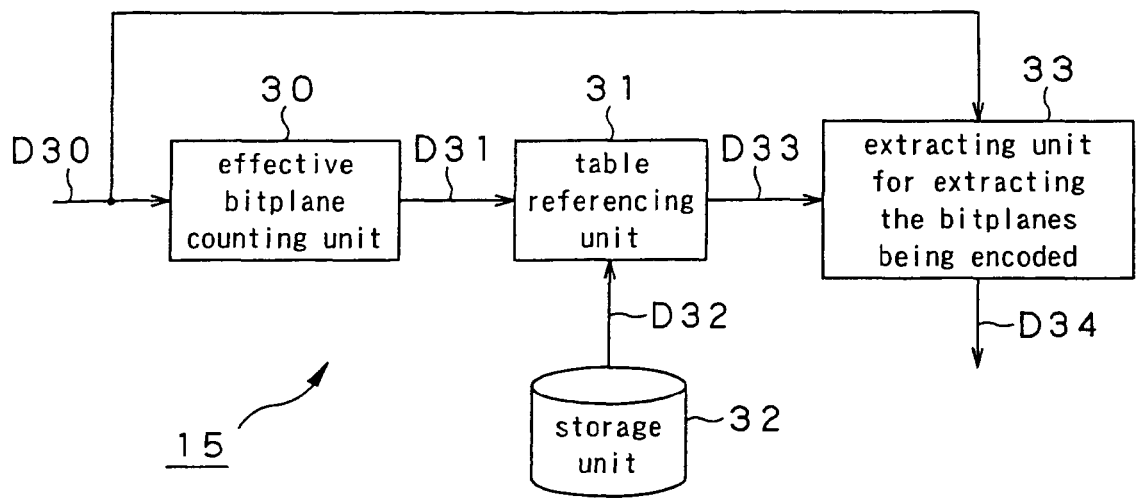
FIG. 9 illustrates an illustrative inner structure of a unit for predicting an object of encoding in the picture encoding apparatus.
FIG. 10 shows an instance of a bitplane number table in case of utilizing the sum total of the numbers of frame-based effective bitplanes.

FIG. 9 shows an instance of an internal structure of this encoding object prediction unit 15. Referring to FIG. 9, the encoding object prediction unit 15 includes an effective bitplane counting unit 30, for counting the number of effective bitplanes, a table referencing unit 31 for referencing a bitplane number table to predict the number of bitplanes, as object for encoding, from the number of the effective bitplanes, a storage unit 32 for storing the bitplane number table, and an extracting unit for extracting the bitplanes to be encoded 33, as will be explained subsequently. Meanwhile, this storage unit 32 may be a ROM (read-only memory) as a read-only non-volatile storage medium.

The effective bitplane counting unit 30 is supplied with an code block based bitplane D30 to count the number of effective bitplanes excluding bitplanes constituted by zero coefficients (zero-bitplanes). The effective bitplane counting unit 30 sums the numbers of the effective bitplanes in the totality of the code blocks in a frame or in a sub-band to send the calculated sum total D31 of the effective bitplanes to the table referencing unit 31.

The table referencing unit 31 references the bitplane number table, stored in the storage unit 32, to read out the number of bitplanes to be encoded D32, from the sum total D31 of the numbers of the effective bitplanes, supplied from the effective bitplane counting unit 30, to route the number of the bitplanes being encoded D33, as read out, to the extracting unit for extracting the bitplanes being encoded 33.

The bitplane number table correlates the range of the values for the number of the effective bitplanes to the number in the range of the bitplanes being encoded.

For example, if the sum total of the frame-based effective bitplanes is to be used, the number of the bitplanes being encoded is correlated with the range for the values of the number of the effective bitplanes. If, in this case, the sum total of the effective bitplanes in the code blocks in one frame is [600], the number [5], as the number of the bitplanes being encoded, may instantaneously be obtained by referencing this table of the number of bitplanes.

Figure 12:
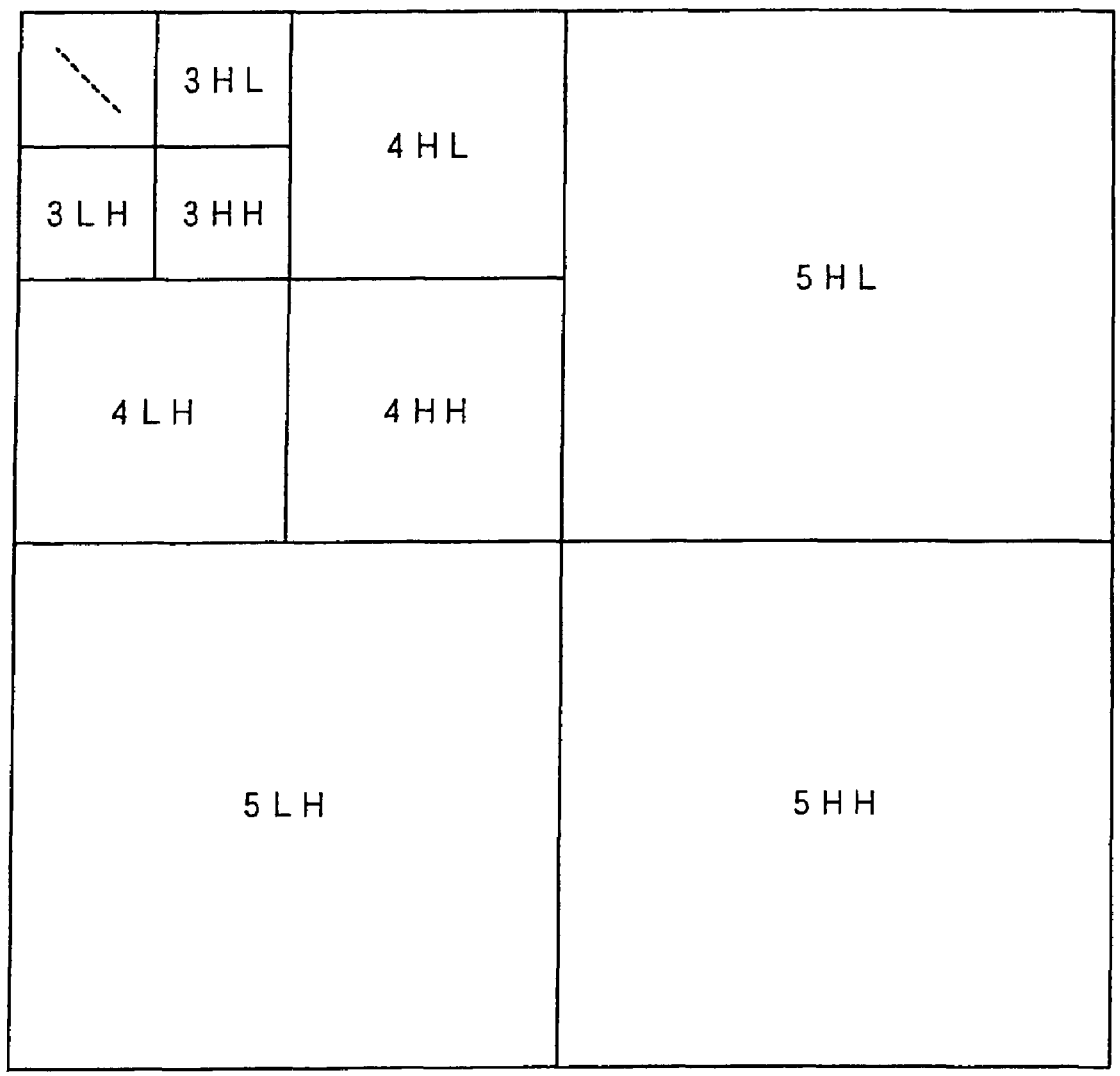
FIG. 12 shows sub-bands of wavelet transform and splitting up to a splitting level=5.

On the other hand, if the sum total of the sub-band based numbers of the effective bitplanes is used, the numbers of the bitplanes being encoded are correlated with the range of values of the numbers of the effective bitplanes in the respective sub-bands. FIG. 11 shows an illustrative table in case wavelet transform and splitting are carried out five times, as shown in FIG. 12. If, in this case, the sum total of the effective bitplanes in the LH sub-band, with the splitting level=3, is [100], the number [3] is instantaneously derived as the number of the bitplanes being encoded by referencing the bitplane number table. The same applies for the other sub-bands. It should be noted that, as compared to the bitplane number table shown in FIG. 10, the bitplane number table shown in FIG. 11 permits more elaborate control and prediction of the number of the effective bitplanes to higher accuracy.

Reverting to FIG. 9, the extracting unit for extracting the bitplanes being encoded 33 extracts only the bitplanes being encoded D34 from the code block based bitplane D30, based on the number of the bitplanes being encoded D33, supplied from the table referencing unit 31. Specifically, the number of bitplanes corresponding to the number of bitplanes being encoded is extracted from the side of the most significant bit (MSB) side. The extracting unit for extracting the bitplanes being encoded 33 sends bitplanes being encoded D34, as extracted, to the bit modeling unit 16, shown in FIG. 1.

It is noted that only the bitplanes being encoded D34, thus extracted, are actually encoded by the downstream side EBCOT unit 18, so that, if the extracted number of the bitplanes being encoded D34 is lesser than the number of the original code block based bitplanes D30, the processing load may correspondingly be relieved to save the time consumed for encoding.

Moreover, the encoding object prediction unit 15 of the present embodiment only references the bitplane number table, in which the numbers of the effective bitplanes are correlated with the number of bitplanes being encoded, at the outset, so that the memory capacity may be just large enough to hold this table, thus reducing the processing load to an extremely small value.

Figure 13:
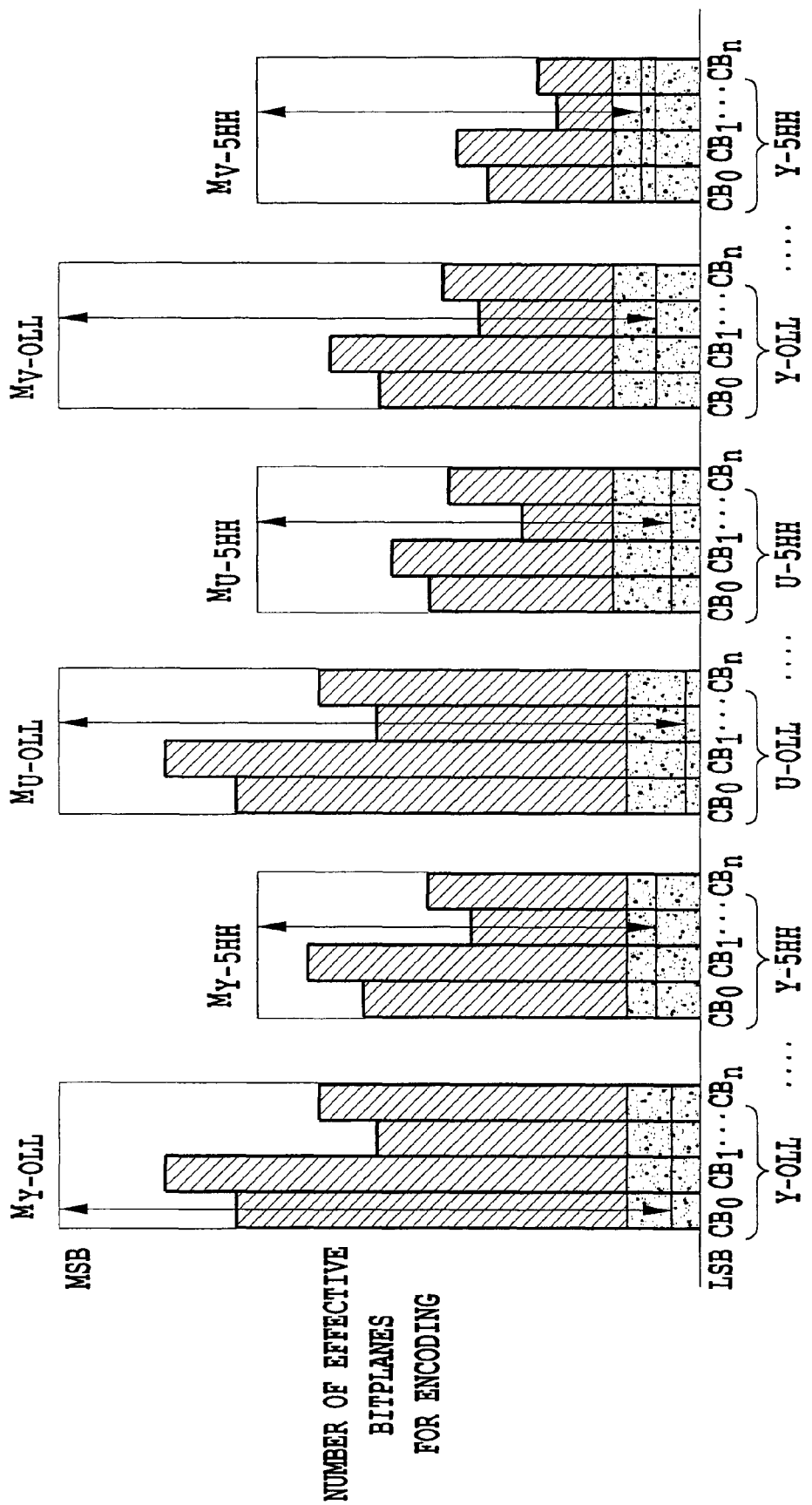
FIG. 13 specifically shows the processing in the encoding object prediction unit from the perspective of a bitplane.

Referring to FIG. 13, this processing is specifically explained from the perspective of the bitplanes. FIG. 13 shows the bitplanes for three components of Y (luminance), U and V (chroma) from one code block (CB) in a sub-band to another. For example, the right end V-5HH stands for 5HH of the chroma component V, that is, shows the bitplane in each code block (CB) present in a sub-band of a splitting level=5 representing the high frequency for both the horizontal and the vertical directions. In FIG. 13, the void areas stand for the zero bitplane, the hatched areas stand for the bitplanes ultimately included in the encoded code stream, and dotted areas stand for the bitplanes which are not used as a result of rate control in the downstream side rate control. The number of the bitplanes, representing the sum of the hatched and dotted areas, correspond to the number of the effective bitplanes.

In the encoding object prediction unit 15, the number of the bitplanes being encoded may be found from the sum total of the effective bitplanes in the totality of the frame-based or sub-band-based code blocks. The number of bitplanes corresponding to the number of the bitplanes being encoded is extracted from the side of the most significant bit (MSB) from one code block (CB) to another.

The boundary lines in the dotted areas indicate the boundary between the bitplanes extracted and those not extracted in the encoding object prediction unit 15.

Specifically, the bitplanes lying towards the least significant bit (LSB) as from the boundary lines are not extracted in the encoding object prediction unit 15.

Figure 14:
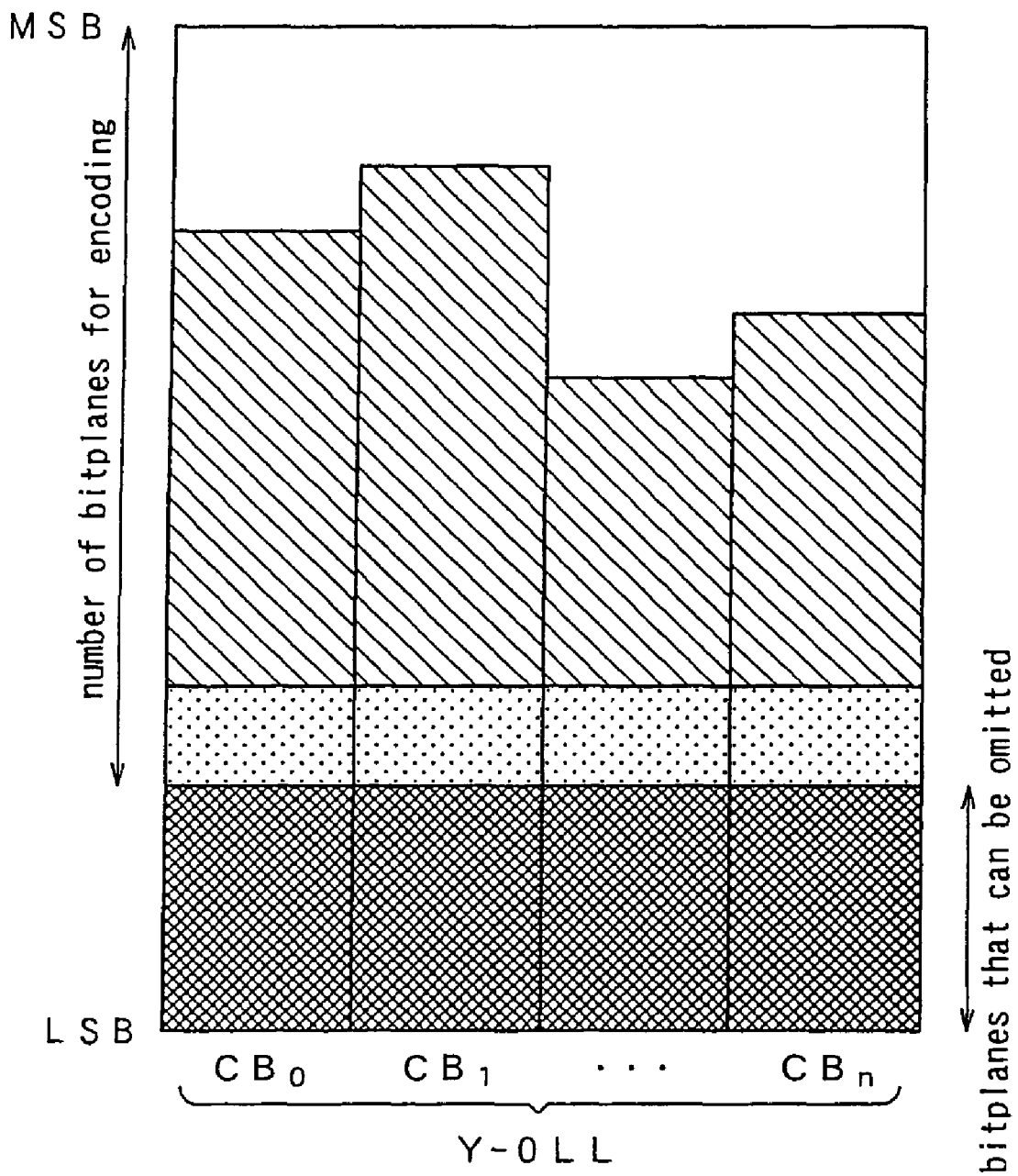
FIG. 14 is a graph specifically showing the lowermost range sub-band of the luminance component Y.

FIG. 14 focuses on the Y-0LL in FIG. 13, that is on the lowermost sub-band of the luminance component Y. The portions in black, shown in FIG. 14, represent the bitplanes the encoding of which by the EBCOT unit 18 may be omitted.

In the present embodiment, the number of bitplanes being encoded is made constant for the totality of the code blocks in the same sub-band from one component to another. This however is merely illustrative, such that, for example, the numbers of the bitplanes being encoded may be varied from one component to another or from one code block to another. In this case, however, a bitplane number table needs to be provided in which the number of bitplanes being encoded is set from one component to another or from one code block to another.

In the above explanation, it is assumed that the bitplane number table is referenced to predict the number of bitplanes being encoded from the number of the effective bitplanes. Alternatively, the number of the encoding passes being encoded may be predicted from the number of the effective bitplanes.

The inner structure of the encoding object prediction unit 15 in this case is shown in FIG. 15. Referring to FIG. 15, the encoding object prediction unit 15 is made up by an effective bitplane counting unit 40, for counting the aforementioned number of the effective bitplanes, a table referencing unit 41 for referencing the bitplane number table to find the number of encoding passes, as the object of encoding, from the number of effective bitplanes, and a storage unit 42 for storage of the encoding pass number table.

The effective bitplane counting unit 40 is supplied with a code block based bitplane D40 to count the number of the effective bitplanes to send to the table referencing unit 41 a sum total D41 of the numbers of the effective bitplanes which is summation of the numbers of the effective bitplanes of the totality of the code blocks in the frame or in the sub-bands.

The table referencing unit 41 references the encoding pass number table stored in the storage unit 42 to read out the number of the encoding passes being encoded D42 from the sum total D41 of the effective bitplanes supplied from the effective bitplane counting unit 40, and sends the number of the encoding passes being encoded D43 as read out to the bit modeling unit 16 shown in FIG. 1.

It is noted that the encoding pass number table correlates the range of values of the effective bitplane number to the number in the range of the encoding passes.

For example, if the sum total of the numbers of the frame-based effective bitplanes is used, the number of the encoding passes being encoded is correlated to the range of the values of the numbers of the effective bitplanes, as shown in FIG. 16. Meanwhile, as may be seen on comparison with FIG. 10, there are occasions where three encoding passes at the maximum occur in one bitplane. In this consideration, the number of the encoding passes being encoded is set to a value larger than the number of the bitplanes being encoded shown in FIG. 10.

In the downstream side EBCOT unit 18, only the number of the encoding passes corresponding to the number of the encoding passes being encoded are actually encoded, beginning from the bitplane on the side of the most significant bit (MSB), from one code block to another, so that, if the number of the encoding passes being encoded D43 is smaller than the number of the encoding passes produced in the bitplane D40 from one original code block to another, the processing load is correspondingly reduced to save the time consumed in encoding.

(2-2) Structure and Operation of the Rate Controller

If the arithmetic code D18, supplied from the arithmetic coding unit 17 in FIG. 1, is directly sent to the downstream side, without passing through the rate controller 19, the possibility is high that the encoded code stream having the compression ratio or the bitrate different than the target compression ratio or bitrate is output. Consequently, ultimate rate control needs to be executed in the rate controller 19.

The rate controller 19 in the present embodiment sequentially selects the arithmetic codes, beginning from the arithmetic codes with a higher rank in the priority sequence, and sums the code volumes of the selected codes. The rate controller halts its operation when the target code volume is reached.

An illustrative inner structure of the rate controller 19 is shown in FIG. 17. The rate controller 19 is made up by a code volume computing controller 50 and a code volume summation controller 51, as shown in FIG. 17.

The code volume computing controller 50 calculates the bitplane based code volume D51 of the arithmetic codes D50, supplied from the arithmetic coding unit 17 (FIG. 1), to send the so calculated bitplane based code volume to the code volume summation controller 51. This code volume summation controller 51 sums the code volumes D51, from one bitplane to another, in accordance with the sequence of priority as later explained. The bitplane information D52, resulting from the summation, is again supplied to the code volume computing controller 50 where the code volume of the totality of the bitplanes used thus far in the summation is compared to a target code volume D54. This loop control is terminated when the target code volume D54 is reached and the arithmetic codes D53 following the control of the ultimate code volume is sent to the header generator 20 and to the packet generator 21 shown in FIG. 1.

The priority sequence in adding the code volume D51 from one bitplane to another is as follows: Of the bitplanes of the totality of the sub-bands, having the most significant bits (MSBs), the bitplanes are sequentially selected in the order from the bitplane having the highest bit position up to the bitplane having the least significant bit (LSB).

Figure 18:
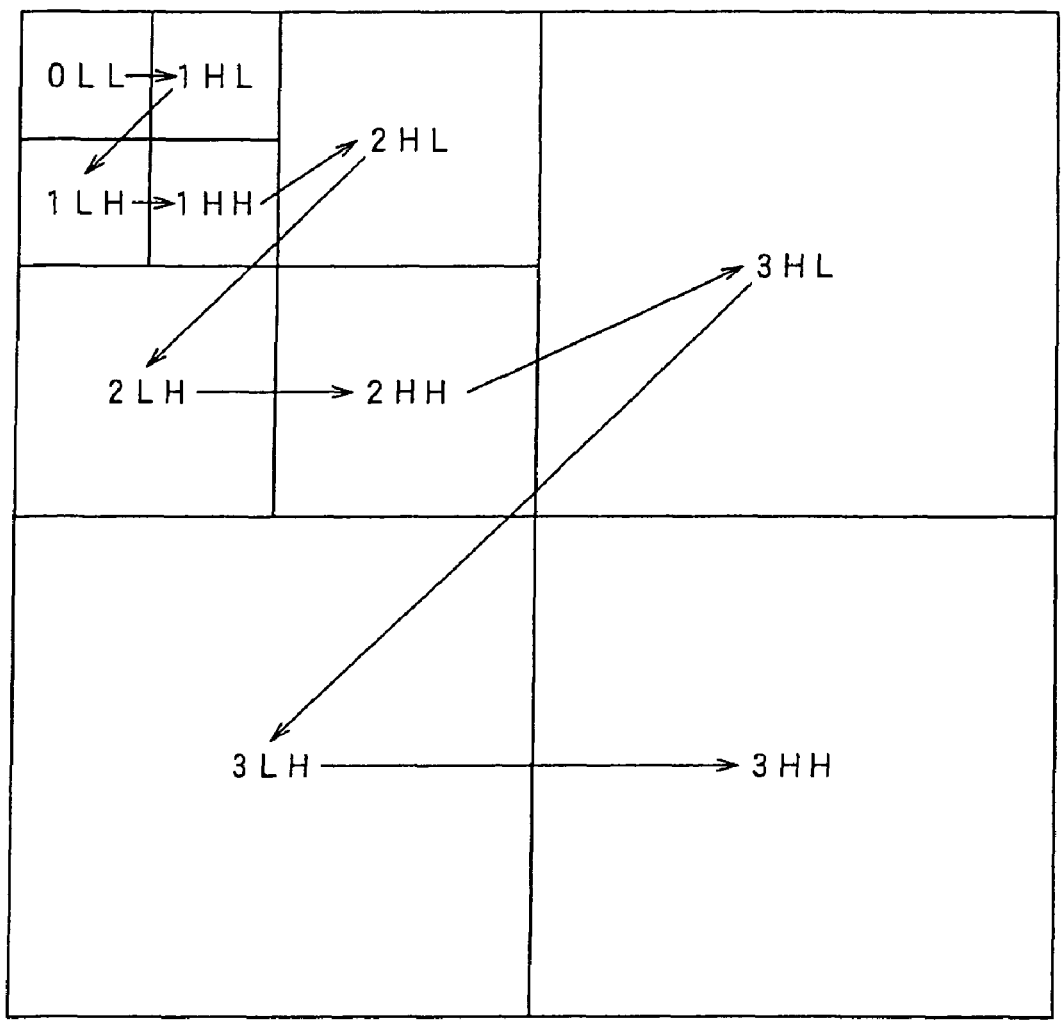
FIG. 18 shows a sub-band based selection sequence.

The sequence of selection of bitplanes of the same bit position of each sub-band is from the sub-band of the lowermost range to the sub-band of the highest range. For example, in case the wavelet transform and splitting are carried out thrice, as shown in FIG. 2, the selection sequence is 0LL, 1HL, 1LH, 1HH, 2HL, 2LH, 2HH, 3HL, 3LH and 3HH, as shown in FIG. 18. It is because the crucial portions of a picture is concentrated not in the high range but in the low range.

The sequence of selection of bitplanes of the same bit position of three components of Y (luminance), U and V (chroma) is e.g., Y, U and V. It is because in general the human visual system is more sensitive to the luminance information than to the chroma information. Meanwhile, the cruciality of U and V, which are both the chroma information, depends on the type of the input picture and hence the priority sequence is desirably made variable.

Figure 19:
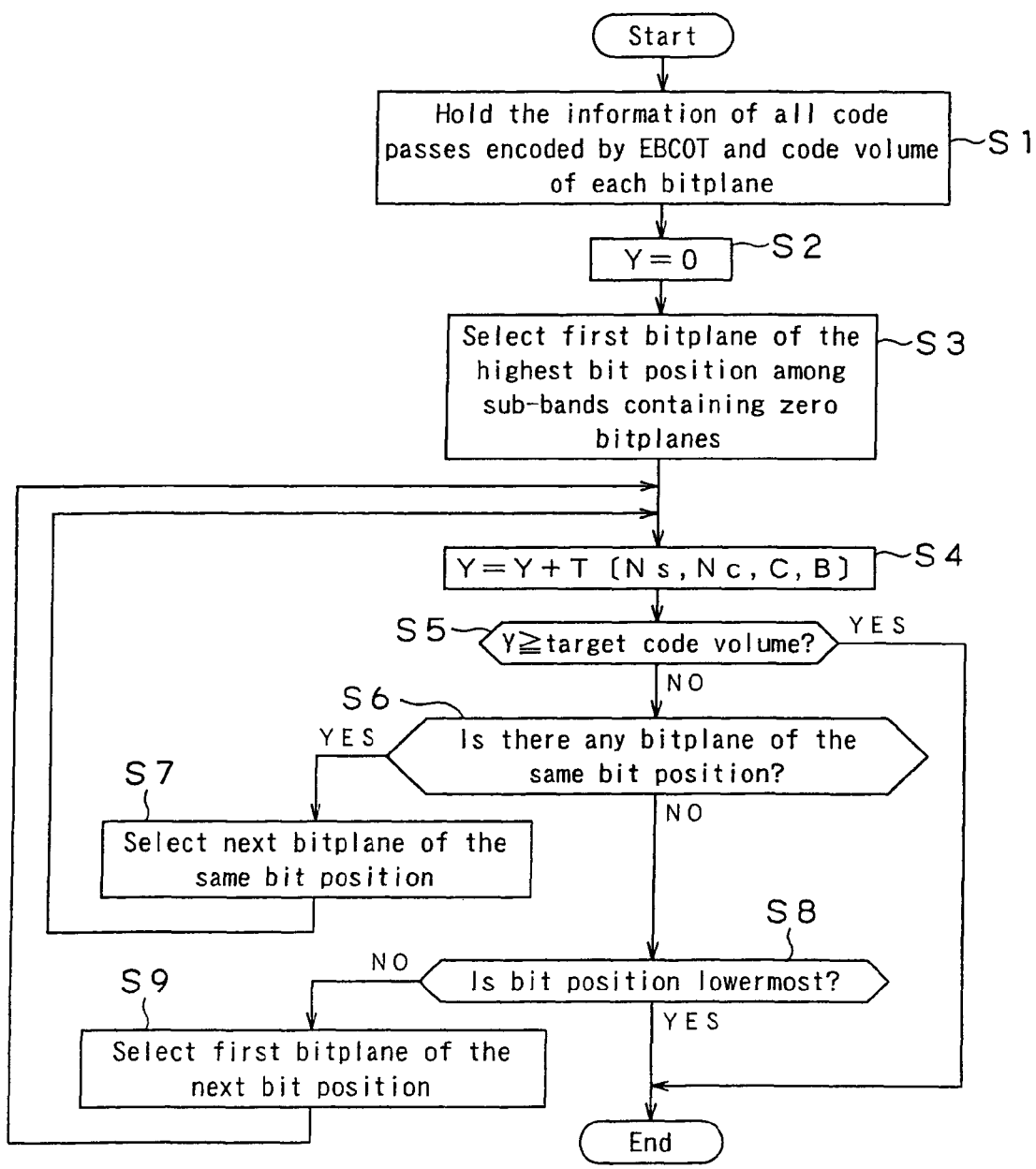
FIG. 19 is a flowchart for illustrating the sequence of operations for summing the bitplane based code volume in the rate controller.

The sequence of operations for summation of the bitplanes is shown in the flowchart of FIG. 19. First, in a step S1, the information on the totality of the encoding passes, encoded by the EBCOT unit 18, and the code volume of each bitplane, are retained.

In the next step S2, a summed code volume Y is initialized to 0 and, in the next step S3, the first bitplane having the highest bit position, inclusive of a zero bitplane, is selected from among the bitplanes of the respective sub-bands. Should there exist plural bitplanes of the same bit position, the sub-band is selected in a sequence from the lowermost sub-band towards the highest sub-band, as long as the sub-bands are concerned, and in the sequence of Y-U-V, for example, as long as the components are concerned.

In the next step S4, the code volume T[Ns, Nc, C and B] of the selected bitplane is summed to Y. It is noted that Ns, Nc, C and B denote the sub-band number, component number, code block number and the bitplane number, respectively.

In a step S5, it is determined whether or not the summed code volume is equal to or larger than the target code volume. If the summed code volume is equal to or larger than the target code volume (yes), the summation processing is terminated.

If the summed code volume is less than the target code volume (no), processing transfers to a step S6.

In this step S6, it is checked whether or not there is any bitplane of the same bit position. If there is any bitplane of the same bit position (yes), processing transfers to a step S7 to select the next bitplane to revert to the step S4. If conversely there is no bitplane of the same position (no), processing transfers to a step S8.

In this step S8, it is determined whether or not the bit position is lowermost, that is if the bit is the lowermost bit (LSB). If the bit position is lowermost (yes), the summation processing is terminated and, if otherwise (no), the next bit position up to the lowermost bit (LSB) is selected in a step S9 to then revert to the step S4.

Figure 20:
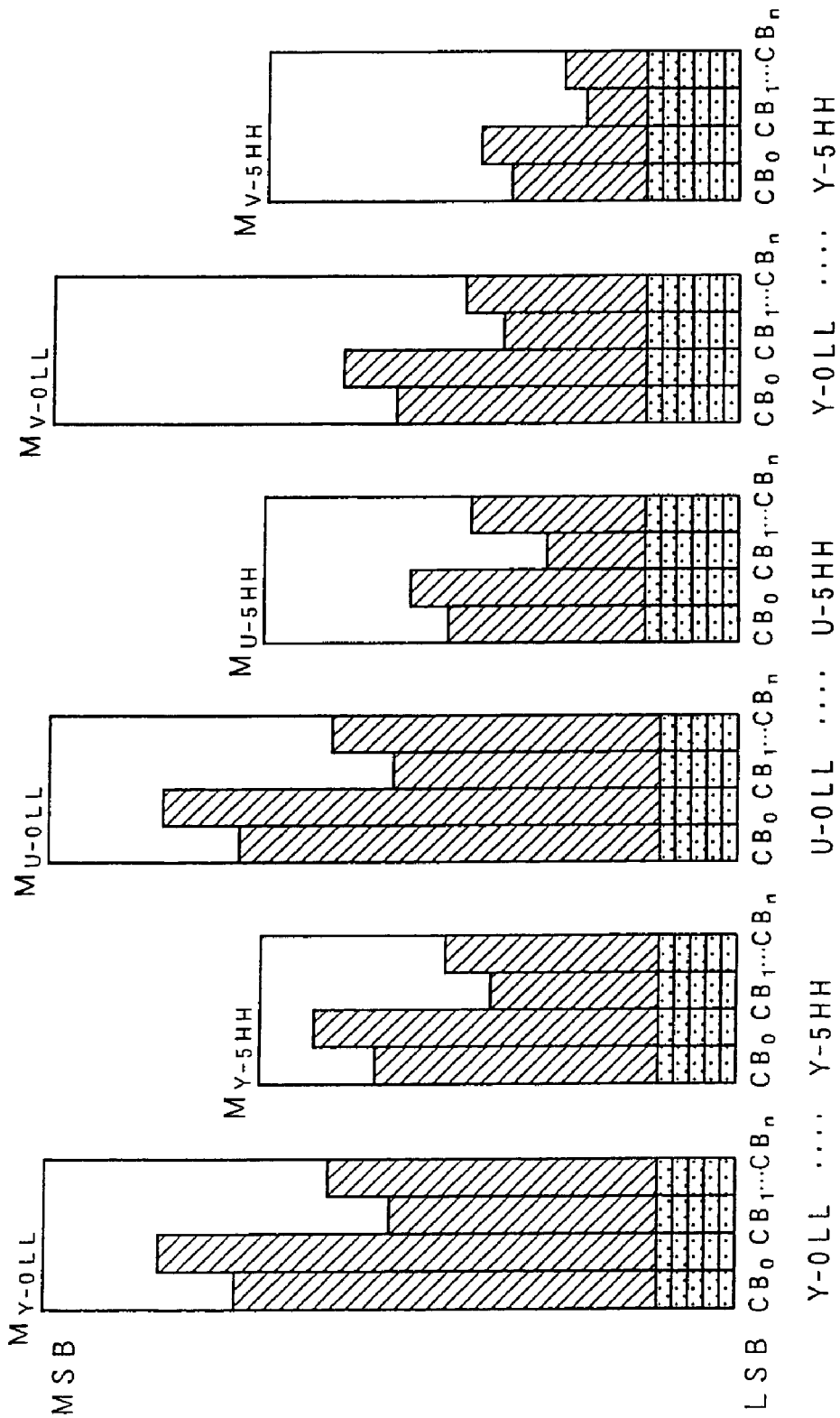
FIG. 20 specifically illustrates the processing in the rate controller from the perspective of a bitplane.

Referring to FIG. 20, the above-described processing is explained more specifically from the perspective of the bitplane. FIG. 20 shows the bitplanes for the respective sub-bands (CB) in the respective sub-bands for the three components Y (luminance), U and V (chroma). As in FIG. 13, the void areas stand for the zero bitplane, the hatched areas stand for the bitplanes ultimately included in the encoded code stream, and dotted areas stand for the bitplanes which are not used as a result of rate control in the downstream side rate control.

Referring to FIG. 20, the rate controller 19 selects the bitplanes in the sequence from the bitplane of the highest bit position, inclusive of the zero bitplane, to the bitplane of the lowermost bit position, that is the least significant bit (LSB), as traversing the sub-bands and the components. If the bit position of plural bitplanes is the same, the bitplanes are selected from the lowermost sub-band to the sub-band of the highest range, as long as the sub-bands are concerned, and in the sequence of for example Y-U-V, as long as the components are concerned. Specifically, in FIG. 20, the bit positions of the Y-0LL, U-0LL and V-0LL are highest among the respective sub-bands, so that the bitplanes are selected from the most significant bit (MSB) side in the sequence of Y-0LL, U-0LL and V-0LL.

In the present embodiment, the bitplanes are selected in the sequence of Y-0LL~Y-5HH, U-0LL~U-5HH and V-0LL~V-5HH as sub-band base selection is put above component-based selection. This, however, is merely illustrative, such that component-based selection may be put above sub-band base selection.

Thus, with the rate controller 19 of the present embodiment, the number of bitplanes not selected ultimately and discarded differs only by one bitplane, as counted from the least significant bit (LSB), with respect to the totality of the code blocks in one frame, so that the difference in the picture quality may be eliminated to yield a picture of high quality on the whole.

(2-3) Operation of the Quantization Unit 12

As aforesaid, the quantization unit 12 applies irreversible compression to the wavelet transform coefficients D12, supplied from the wavelet conversion unit 11, by scalar quantization of dividing the wavelet transform coefficients by the quantization step size.

Meanwhile, the quantization provided for in the JPEG-2000 standard divides a given transform coefficient $a_b(x, y)$, where x and y stand for the positions in the horizontal and vertical directions, respectively, by the quantization step size $\Delta W_b$ for a sub-band b, to calculate the quantization coefficient $Q_b(x, y)$, as indicated by the following equation (1):

$$Q_b(x,y) = \text{sign}(a_b(x,y)) \times |a_b(x,y)|/\Delta W_b \qquad (1).$$

In the above equation (1), $\Delta W_b$ may be calculated in accordance with the following equation (2):

$$\Delta W_b = \Delta B\text{-Step}/L2_b = \Delta N_b \qquad (2)$$

where $\Delta B$-Step denotes the basic step size common to the totality of the sub-bands, $L2_b$ denotes an L2 norm of the basis waveform of a synthesizing filter for the sub-band b and $\Delta Nb$ denotes the normalized quantization step size of the sub-band b.

After calculating $\Delta W_b$, an exponent $\epsilon_b$ and a mantissa $\mu_b$ are found in accordance with the following equation (3):

$$\Delta W_b = 2^{Rb-eb}(1+(\mu_b/2^{11})) \qquad (3)$$

where $R_b$ denotes the dynamic range in the sub-band b. These values $\epsilon_b$ and $\mu_b$ are actually included in the ultimate encoded codestream.

It is noted that, in finding the quantization step size $\Delta W_b$, the quantization unit 12 calculates the quantization step size not using the aforementioned equation (2), but using sub-band b based weighting coefficients $VW_b$, in accordance with the following equation (4):

$$\Delta W_b = (\Delta B\text{-Step}/L2_b)/VW_b = \Delta N_b/VW_b \qquad (4).$$

These weighting coefficients $VW_b$ may be set from one sub-band to another or from one component, such as Y (luminance), Cb (chroma) or Cr (chroma), to another, and are stored as a weighting coefficient table. The larger the value of this weighting coefficient, the smaller becomes $\Delta W_b$, as may be seen from the aforementioned equation (3), and the larger becomes the quantization coefficient $Q_b(x, y)$, as may be seen from the aforementioned equation (1). It is therefore desirable for the values of the weighting coefficients to be larger as the frequency proceeds towards a lower frequency range where critical portions of an image are concentrated. It is also desirable for the values of the weighting coefficients for the luminance information (Y) to be larger because the human visual system is more sensitive to the luminance information (Y) than to the chroma information (Cb, Cr).

FIG. 21 shows a typical weighting coefficient table for a case wherein, as shown in FIG. 12, waveform transform and splitting is carried out five times. As shown in FIG. 21, the value of the weighting coefficient is larger towards a low frequency range with the smaller value of the splitting level, while the value of the weighting coefficient for the luminance information (Y) is larger than that for the chroma information (Cr, Cb).

In the downstream side encoding block 13, the quantization coefficient D13, generated in the quantization unit 12, is split into code blocks of a predetermined size, whereas, in the bitplane resolving unit 14, the code block based quantization coefficient D14 is resolved into bitplanes. Thus, the larger the value of the quantization coefficient, the larger becomes the number of the bit planes, so that, when the bit plane based or encoding pass based arithmetic codes are selected in the rate controller 19 in a sequence from an arithmetic code with the highest bit position to an arithmetic code with the lowest bit position, in the totality of the encoding blocks, from one bitplane to another and from one code block to another, it is possible to get more crucial information preferentially included in the encoded codestream and hence to provide an encoded picture of a higher picture quality.

(3) Other Considerations

The above-described JPEG-2000 standard is the standard for still pictures, while no sufficient researches have been made for moving pictures, frequently encountered in the case of moving pictures. Thus, if the technique for still pictures is applied unchanged to the moving pictures, deterioration of the picture becomes outstanding, as now specifically explained.

Figure 22:
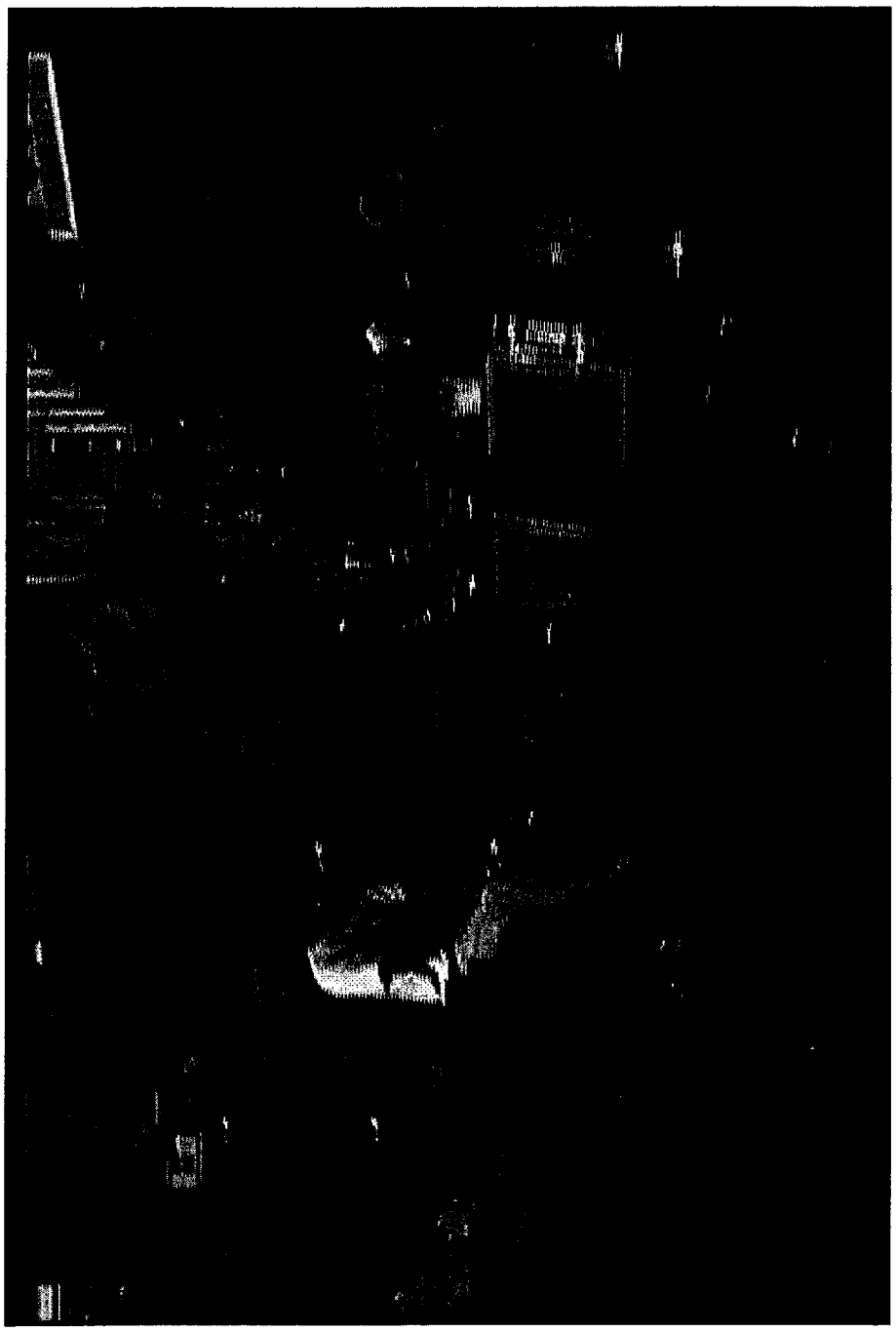
FIG. 22 shows an instance of an interlaced moving picture.

FIG. 22 shows a frame of a scene of an interlaced moving picture. If this is seen on a monitor of a progressive system, such as a PC monitor, the portion of the picture exhibiting movements are strongly affected by the interlaced scanning, such that a striped pattern extending in the transverse direction may be observed.

Figure 23B:
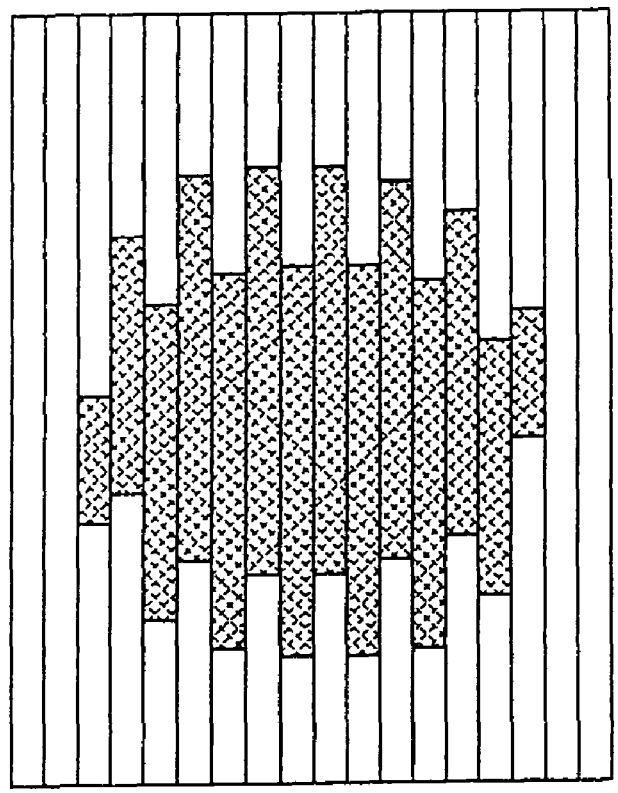
FIG. 23 shows how an image of an object is seen in an interlaced image, FIG. 23A showing the case in which an object is moved towards right in an interlaced image and FIG. 23B showing how the image of the object is seen in a progressive image.
Figure 23A:
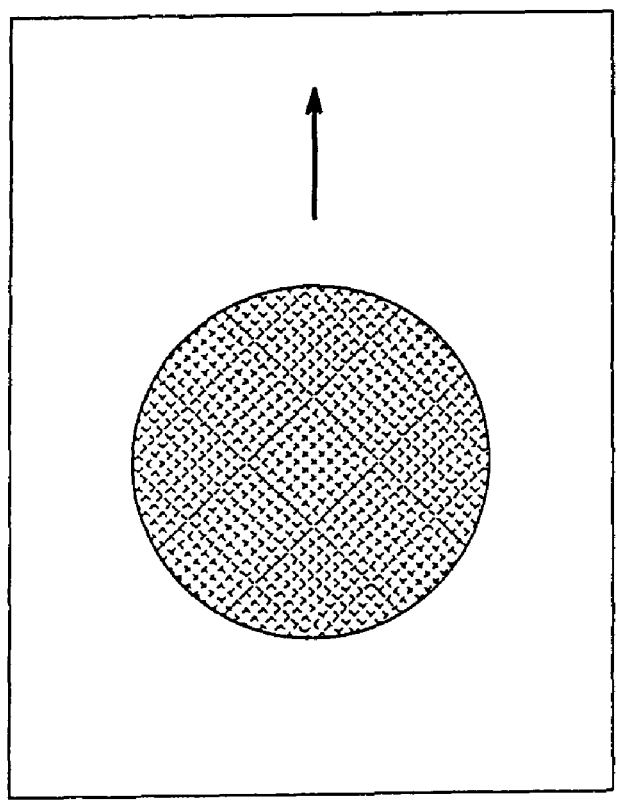

That is, when a round-shaped object is moved towards right in an image, as shown in FIG. 23A, no problem is raised in an interlaced picture. However, in a progressive picture, a striped pattern is seen extending in the transverse direction, as shown in FIG. 23B. This is attributable to the fact that an interlaced picture uses interlaced scanning for the even and odd fields.

Figure 24:
FIG. 24 illustrates the sub-band in case an interlaced image is wavelet transformed and split.

FIG. 24 shows the status of each sub-band obtained on executing the wavelet transform and splitting the image shown in FIG. 22 five times. As may be seen from FIG. 24, the energy of the coefficients of the 5LH component, that is the sub-band with the splitting level=5, which is of the low frequency in the horizontal direction and of the high frequency in the vertical direction, is larger than that of the remaining sub-bands.

Thus, by directly encoding the code blocks in the 5LH sub-band, it is possible to realize the encoding in which importance is attached to the interlaced components.

On the other hand, if the image is to be output to a progressive image display apparatus, it is sufficient if the code blocks in the 5LH sub-band is not encoded. Specifically, it is sufficient if the number of bitplanes or encoding passes of the totality of the code blocks in the 5LH sub-bands is set to 0. Meanwhile, the number of bitplanes or encoding passes of the code blocks not only in the LH component of the highest splitting level but also in the LH components in the totality of the splitting levels may be set to 0.

For example, if the number of the bitplanes being encoded is predicted by the encoding object prediction unit 15 from the sum total of the numbers of the effective bitplanes of the totality of the code blocks, from one sub-band to another, as shown in FIG. 11, it is sufficient if the number of the bitplanes being encoded, belonging to the 5LH component, are set to 0, as shown in FIG. 25.

The present invention is not limited to the embodiments described with reference to the drawings and, as may be apparent to those skilled in the art, various changes may be envisaged without departing from the scope and the purport of the invention as defined in the appended claims.

For example, the above-described embodiment is directed to a hardware structure. However, optional processing may be realized by having a CPU (central processing unit) execute a computer program. In this case, the computer program may be provided as it is recorded on a recording medium or by transmission over a transmission medium, such as the Internet.

What is claimed is:

1. An image encoding apparatus, comprising:
   filtering means for generating a plurality of sub-bands, and applying hierarchical filtering to the sub-bands;
   code block generating means for splitting the sub-bands generated by said filtering means for generating a plurality of code blocks each being of a predetermined size;
   bitplane generating means for generating a plurality of bitplanes from the most significant bit to the least significant bit, in terms of said code block as a unit;
   encoding object predicting means for predicting a number of bitplanes for encoding, as object of the encoding, and for extracting, from an upper bit side of each code block, only a number of bitplanes corresponding to a predicted number of bitplanes for encoding, and counting the number of the effective bitplanes, excluding zero bitplanes, for the totality of the code blocks in the sub-bands of an input picture, and wherein reference is made to a predetermined table, based on the count results, to find the number of the bitplanes for encoding, from one sub-band to another;

bit modeling means for performing bit modeling from one bitplane extracted by said encoding object predicting means to another;

encoding pass generating means for generating an encoding pass from one bitplane to another;

arithmetic coding means for performing arithmetic coding in the encoding passes generated by said encoding pass generating means;

code volume controlling means for controlling the code volume, based on arithmetic codes generated by said arithmetic coding means, so that a target code volume will be reached; and packet generating means for appending a header to the arithmetic codes controlled as to code volume by said code volume controlling means, to generate a packet.

2. The image encoding apparatus according to claim 1, wherein said encoding object predicting means counts the number of effective bitplanes, excluding zero bitplanes, for the totality of the code blocks in a frame in an input picture, and reference is made to a predetermined table, based on the count results, to find the number of bitplanes for encoding, from one frame to another.

3. The image encoding apparatus according to claim 2, wherein said predetermined table is such a table in which the range of values of the effective bitplanes is correlated with the number of the bitplanes for encoding.

4. The image encoding apparatus according to claim 1, wherein said predetermined table is such a table in which the range of values of the effective bitplanes is correlated with the number of bitplanes for encoding, from one sub-band to another.

5. The image encoding apparatus according to claim 4, wherein when the input picture is an interlaced picture, the number of bitplanes for encoding, associated with the sub-band with the highest splitting level, which is in the low range in the horizontal direction and which is in the high range in the vertical direction, is set to zero.

6. The image encoding apparatus according to claim 4, wherein when the input picture is an interlaced picture, the number of bitplanes for encoding, associated with the sub-bands of the totality of splitting levels, which are in the low range in the horizontal direction and which are in the high range in the vertical direction, is set to zero.

7. The image encoding apparatus according to claim 2, wherein said predetermined table is stored in a ROM (read-only memory).

8. An image encoding method, comprising:
generating a plurality of sub-bands, and applying hierarchical filtering to the sub-bands;
splitting the sub-bands generated by said filtering to generating a plurality of code blocks each being of a predetermined size;
generating a plurality of bitplanes from the most significant bit to the least significant bit, in terms of said code block as a unit;
predicting a number of bitplanes for encoding, as object of the encoding, and for extracting, from an upper bit side of each code block, only a number of bitplanes corresponding to a predicted number of bitplanes for encoding, and counting the number of the effective bitplanes, excluding zero bitplanes, for the totality of the code blocks in the sub-bands of an input picture, and wherein reference is made to a predetermined table, based on the count results, to find the number of the bitplanes for encoding, from one sub-band to another;

performing bit modeling from one bitplane extracted by said encoding object predicting to another bitplane;

generating an encoding pass from one bitplane to another bitplane;

performing arithmetic coding in the encoding pass generated;

controlling the code volume, based on arithmetic codes generated by said arithmetic coding, so that a target code volume will be reached; and appending a header to the arithmetic codes controlled as to code volume by said code volume controlling to generate a packet.

9. A non-transitory computer-readable recording medium having recorded thereon a program for having a computer execute a preset processing comprising:
generating a plurality of sub-bands, and applying hierarchical filtering to the sub-bands;
splitting the sub-bands generated by said filtering to generate a plurality of code blocks each being of a predetermined size;
generating a plurality of bitplanes from the most significant bit to the least significant bit, in terms of said code block as a unit;
predicting a number of bitplanes for encoding, as object of the encoding, and for extracting, from an upper bit side, only a number of bitplanes corresponding to a predicted number of bitplanes for encoding, and counting the number of the effective bitplanes, excluding zero bitplanes, for the totality of the code blocks in the sub-bands of an input picture, and wherein reference is made to a predetermined table, based on the count results, to find the number of the bitplanes for encoding, from one sub-band to another;

performing bit modeling from one bitplane extracted to another bitplane;

generating an encoding pass from one bitplane to another bitplane;

performing arithmetic coding in the encoding pass generated;

controlling the code volume, based on arithmetic codes generated by said arithmetic coding, so that a target code volume will be reached; and appending a header to the arithmetic codes controlled as to code volume by said code volume controlling means to generate a packet.

10. A computer-readable recording medium having recorded thereon a program for having a computer execute preset processing, comprising:
generating a plurality of sub-bands, and applying hierarchical filtering to the sub-bands;
splitting the sub-bands generated by said filtering step to generate a plurality of code blocks each being of a predetermined size;
generating a plurality of bitplanes from the most significant bit to the least significant bit, in terms of said code block as a unit;
predicting a number of encoding passes for encoding, as object of the encoding, for generating information on the number of the encoding passes, and counting a number of effective bitplanes, excluding zero bitplanes, for a total number of code blocks in the sub-bands of an input picture, and reference is made to a predetermined table, based on the number of effective bitplanes, to find a number of bitplanes for encoding, from one sub-band to another;

performing bit modeling from one bitplane to another;

generating an encoding pass from one bitplane to another;

performing arithmetic coding only on a number of the encoding passes, afforded by the information on the number of encoding passes, as counted from the most significant bit side of each code block, from among the encoding passes generated;

controlling the code volume, based on an arithmetic code generated by said arithmetic coding, so that a target code volume will be reached; and appending a header to the arithmetic codes, controlled as to code volume by said code volume controlling, to generate a packet.

11. A non-transitory computer-readable recording medium having recorded thereon a program for having a computer execute preset processing, said program comprising:

generating a plurality of sub-bands, and applying hierarchical filtering to the sub-bands;

splitting the sub-bands generated by said filtering to generate a plurality of code blocks each being of a predetermined size;

generating a plurality of bitplanes from the most significant bit to the least significant bit, in terms of said code block as a unit;

predicting a number of bitplanes for encoding, as object of the encoding, and for extracting, from an upper bit side of each code block, only a number of bitplanes corresponding to a predicted number of bitplanes for encoding, and counting the number of the effective bitplanes, excluding zero bitplanes, for the totality of the code blocks in the sub-bands of an input picture, and wherein reference is made to a predetermined table, based on the count results, to find the number of the bitplanes for encoding, from one sub-band to another;

performing bit modeling from one bitplane extracted to another bitplane;

generating an encoding pass from one bitplane to another bitplane;

performing arithmetic coding in the encoding passes generated;

controlling the code volume, based on an arithmetic code generated by said arithmetic coding, so that a target code volume will be reached; and appending a header to the arithmetic codes controlled as to code volume by said code volume controlling steps, to generate a packet.

12. A non-transitory computer-readable recording medium having recorded thereon a program for having a computer execute preset processing, said program comprising:

generating a plurality of sub-bands, and applying hierarchical filtering to the sub-bands;

splitting each sub-band generated by said filtering to generate a plurality of code blocks each being of a predetermined size;

generating a plurality of bitplanes from the most significant bit to the least significant bit, in terms of said code block as a unit;

counting a number of effective bitplanes, excluding zero bitplanes, for a total number of code blocks in the sub-bands of an input picture, and reference is made to a predetermined table, based on the number of effective bitplanes, to find a number of bitplanes for encoding, from one sub-band to another;

performing bit modeling from one bitplane to another;

generating an encoding pass from one bitplane to another;

executing arithmetic coding in the encoding pass generated in said encoding pass generating step;

controlling the code volume, based on the arithmetic code generated in said arithmetic coding, so as to yield a target code volume; and appending a header to the arithmetic codes, the code volume of which has been controlled by the code volume controlling step, to generate a packet; wherein in said code volume controlling, said arithmetic codes are summed in a sequence from the arithmetic code with the highest bit position in the totality of the code blocks of said input picture to the arithmetic code of the lowermost bit, from one bitplane to another or from one code pass to another, and summation is halted when a preset target code is exceeded.

13. A non-transitory computer-readable recording medium having recorded thereon a program for having a computer execute a preset processing, said program comprising:

generating a plurality of sub-bands, and applying hierarchical filtering to the sub-bands;

dividing transform coefficients in the sub-bands, generated by said filtering, with a quantization step size, weighted using weighting coefficients set from one sub-band to another, by way of performing quantization;

splitting each sub-band following said quantization for generating a plurality of code blocks each being of a predetermined size;

generating a plurality of bitplanes from the most significant bit to the least significant bit, from one code block to another;

predicting a number of bitplanes for encoding, as object of the encoding, and for extracting, from an upper bit side of each code block, only a number of bitplanes corresponding to a predicted number of bitplanes for encoding, and counting the number of the effective bitplanes, excluding zero bitplanes, for the totality of the code blocks in the sub-bands of an input picture, and wherein reference is made to a predetermined table, based on the count results, to find the number of the bitplanes for encoding, from one sub-band to another;

performing bit modeling from one bitplane to another;

generating encoding passes from one bitplane to another bitplane;

performing arithmetic coding in the encoding passes generated by said encoding pass generating;

controlling the code volume, based on the arithmetic codes, generated by said arithmetic coding, so that a target code volume will be reached; and appending a header to the arithmetic codes, controlled as to code volume by said code volume controlling, to generate a packet;

said code volume controlling includes summing said arithmetic codes in a sequence from the arithmetic code with the highest bit position to the arithmetic code with the lowermost bit, in the totality of the code blocks of said input picture, from one bitplane to another or from one code pass to another, said code volume controlling includes halting the summation when a preset target code volume is exceeded.

* * * * *